(12) United States Patent
Schulz et al.

(10) Patent No.: US 11,207,810 B2
(45) Date of Patent: Dec. 28, 2021

(54) LIQUID ADDITIVE DELIVERY SYSTEM AND METHODS FOR ENSURING SUBSTANTIALLY ONLY A LIQUID IS DISPOSED WITHIN A CONTAINER

(71) Applicant: 3M INNOVATIVE PROPERTIES COMPANY, St. Paul, MN (US)

(72) Inventors: Mark F. Schulz, Lake Elmo, MN (US); Brian S. Boothman, San Jose, CA (US); Scott D. Gullicks, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/621,420

(22) PCT Filed: Jun. 26, 2018

(86) PCT No.: PCT/US2018/039397
§ 371 (c)(1),
(2) Date: Dec. 11, 2019

(87) PCT Pub. No.: WO2019/005726
PCT Pub. Date: Jan. 3, 2019

(65) Prior Publication Data
US 2020/0108533 A1    Apr. 9, 2020

Related U.S. Application Data

(60) Provisional application No. 62/524,779, filed on Jun. 26, 2017.

(51) Int. Cl.
*B29C 45/18* (2006.01)
*B65B 3/18* (2006.01)
*B65D 83/00* (2006.01)

(52) U.S. Cl.
CPC ............ *B29C 45/1866* (2013.01); *B65B 3/18* (2013.01); *B65D 83/0055* (2013.01); *B65D 83/0072* (2013.01)

(58) Field of Classification Search
CPC ....... B29C 45/1866; B29C 31/10; B65B 3/18; B65B 3/16; B65B 3/24; B65D 83/0055;
(Continued)

(56) References Cited

U.S. PATENT DOCUMENTS 4,407,431 A * 10/1983 Hutter, III ................. B29B 7/72
222/1
4,601,409 A    7/1986 DiRegolo
(Continued)

FOREIGN PATENT DOCUMENTS

EP    3135452    3/2017
WO    WO 8602320    4/1986
(Continued)

OTHER PUBLICATIONS

International Search Report for PCT International Application No. PCT/US2018/039397, dated Dec. 17, 2018, 8 pages.
(Continued)

*Primary Examiner* — Jason K Niesz

(57) ABSTRACT

Methods, apparatuses and systems are disclosed including a method of filling a container with substantially only a liquid. The method can include the removal of a gas from the container prior to, during or after the filling of the container with the liquid. According to one embodiment, the container includes an inner liner and a lid. The method includes providing a volume defined by at least the inner liner and the lid of the container. In such embodiment, the liquid can initially be contained within a first portion of the volume and a remaining portion of the volume can contain a gas. The method can include removing substantially all the gas from
(Continued)

the volume via one or more ports that communicate with the volume while retaining substantially only the liquid within the volume.

10 Claims, 15 Drawing Sheets

(58) Field of Classification Search
CPC .. B65D 83/0072; B05B 9/0872; B05B 9/0861
See application file for complete search history.

(56) References Cited

U.S. PATENT DOCUMENTS

| | | | |
|---|---|---|---|
| 5,636,762 A | 6/1997 | Juhola | |
| 5,909,825 A | 6/1999 | Lydford | |
| 7,111,652 B2 * | 9/2006 | Koide | B01F 5/0647 |
| | | | 141/104 |
| 2005/0092386 A1 | 5/2005 | Kaufhold | |
| 2006/0081304 A1 * | 4/2006 | Franks | B67D 7/0205 |
| | | | 141/65 |
| 2011/0108568 A1 | 5/2011 | Hogan | |
| 2013/0270303 A1 | 10/2013 | Centofante | |
| 2016/0039659 A1 | 2/2016 | Ware | |

FOREIGN PATENT DOCUMENTS

| | | |
|---|---|---|
| WO | WO 2011-046802 | 4/2011 |
| WO | WO 2011-085012 | 7/2011 |
| WO | WO 2013-074923 | 5/2013 |

OTHER PUBLICATIONS

Annex to the Search Results Under Rule 164(2)(b) EPC for Application No. EP18743915, dated Oct. 6, 2021.

* cited by examiner

LIQUID ADDITIVE DELIVERY SYSTEM AND METHODS FOR ENSURING SUBSTANTIALLY ONLY A LIQUID IS DISPOSED WITHIN A CONTAINER

CROSS REFERENCE TO RELATED APPLICATIONS

This application is a national stage filing under 35 U.S.C. 371 of PCT/US2018/039397, filed Jun. 26, 2018, which claims the benefit of U.S. Application No. 62/524,779, filed Jun. 26, 2017, the disclosure of which is incorporated by reference in its/their entirety herein.

BACKGROUND

The present disclosure relates to the containment of a liquid within a container. More particularly, the disclosure relates to methods for ensuring that substantially only the liquid is disposed within the container.

Many processes require liquids to be contained within a vessel for later dispensation. However, the addition of a gas within such vessels in addition to the liquid can cause inaccuracy when the liquid is dispensed. In some cases, the gas can have other adverse effects on the liquid such as causing spoilage or hardening. Thus, the presence of the gas within the vessel along with the liquid can cause waste.

In light of the above, a need exists for improved methods for the containment of liquids so as to have minimal interaction with gas.

SUMMARY

Aspects of the present disclosure include a method of filling a container with substantially only a liquid. The method can include the removal of a gas from the container prior to, during or after the filling of the container with the liquid. According to one embodiment, the container includes an inner liner and a lid, the construction of which will be discussed subsequently. The method includes providing a volume defined by at least the inner liner and the lid of the container. In such embodiment, the liquid can initially be contained within a first portion of the volume and a remaining portion of the volume can contain a gas. An example of such a container having the inner liner and the lid is disclosed in United States Patent Application Publication No. 2013/0270303A1, entitled, "Dispensing liquids from a container coupled to an integrated pump cap", the entire specification of which is incorporated herein by reference in its entirety.

According to some embodiments, the liquid is a Newtonian fluid. In other embodiments, the liquid is a non-Newtonian fluid. For example, the liquid can be any one or any combination of an adhesive, cement, colorant, coating, detergent, epoxies, dye, filler (e.g., body filler), nano-material, oil, paint (e.g., automotive paint), paste, pigment, caulk, urethane, polymer additive (which may be organic or inorganic), sealant, stain, toner, varnish, and wax.

According to some embodiments, the rheology of the liquid may be tailored such that the viscosity of the liquid is low during flow into the pump (priming) (e.g., at a higher shear rate), then the viscosity can increase after the liquid has stopped flowing into the pump (e.g., at a lower shear rate) thereby preventing the gas from re-entering the container. This same mechanism can be used for several of the embodiments further described below. For example, an embodiment where the gas is removed by vacuum or higher external pressure to push the air out through the pump, vent, or other small orifice. The properties of the liquid can be tailored such that the liquid seals the pump, vent, or other small orifice. In other embodiments, the gap sizes can be adjusted in the pump to increase the resistance to gas re-entering the container (smaller gap size results in higher resistance to flow). Thus, the properties of the liquid and/or gap sizes can be adjusted to provide sufficiently easy removal of gas/priming of pump (e.g., low resistance to flow) and sufficiently difficult re-entry of gas back into the container (e.g., high resistance to flow).

In some embodiments, the viscosity of the fluid is higher at a lower shear rate than it is at a higher shear rate. For example, in some embodiments the viscosity of the fluid at $0.1\ \text{sec}^{-1}$ is 1.5 times greater than the viscosity of the fluid at $1.0\ \text{sec}^{-1}$. (Note that the units of shear rate are $\text{sec}^{-1}$, or reciprocal seconds). In some embodiments, 2 times greater, 3 times greater, 4 times greater, 5 times greater, 10 times greater.

In some embodiments, the viscosity of the fluid is between 0.1 and 10,000 Pa-s at a shear rate of $1.0\ \text{sec}^{-1}$. In some embodiments, between 0.1 and 1000, between 0.1 and 500, between 1 and 100 (all at shear rate of $1\ \text{sec}^{-1}$).

In some embodiments, the viscosity of the fluid is between 0.1 and 10,000 Pa-s at a shear rate of $0.1\ \text{sec}^{-1}$. In some embodiments, between 1 and 1000, between 5 and 1000, between 10 and 1000, between 50 and 1000, between 100 and 1000 (all at shear rate of $0.1\ \text{sec}^{-1}$).

The liquids may be neat (including concentrates) or in the form of dispersion, solution, or suspension. Unless otherwise noted, viscosity values if provided are at a temperature of 20° C. and pressure of 1 bar.

Liquids including the liquids disclosed herein can be very difficult to dispense accurately if gas is present in the container. For example, in some cases the gas does not get pumped efficiently in the pump, which results in liquid becoming trapped in the container (over a reasonable pumping time). In some embodiments, the liquid does not flow readily by gravity, resulting in air getting to the pump before the liquid is completely removed (especially if the container is filled upright then inverted to pump), in turn resulting in the possibility of intermittent liquid flow. Furthermore, the gas, if present, can cause excessive waste of the liquid due to hardening of the liquid. Hardening of the liquid can leave an amount of the liquid trapped within the container that cannot be dispensed and is therefore wasted. Thus, the disclosed methods and containers can ensure substantially no gas is present in the container with the liquid to minimize waste. Additionally, leaving substantially only the liquid in the container can allow for a more precise amount of liquid to be dispensed in a more controlled manner.

In some embodiments, the disclosed container design with the lid, the inner liner and/or an outer housing can be used for injection molding of colored plastics where the liquid housed by the container comprises a liquid colorant. The disclosed container, along with the techniques disclosed herein related to ensuring substantially only the liquid is housed in the container, can therefore be used to reduce molding costs. For example, a neutral base material can be used for all colors so molders do not need to maintain a number of different colored base materials. Additionally, color quality and/or molded part physical properties can be improved by eliminating the heat history from reheating colored base plastic material that has already been melted for coloring. Also using a liquid colorant directly eliminates additional processing, for example drying pre-colored base plastic materials, thereby saving the time and cost to dry the base material.

According to one embodiment, the method of filling the container with substantially only the liquid includes removing substantially all the gas from the volume via one or more ports that communicate with the volume while retaining substantially only the liquid within the volume. As used here the term "substantially all the gas", "substantially no gas" or the like means some percentage of the volume of the container may still be filled by the gas after the removal process. According to one embodiment, this percentage is less than 5% of the volume. According to further embodiments, the percentage can be less than 3%, in some cases less than 1%, and in some cases less than 0.5% of the volume. These percentages would not include any gas that is not immediately free to escape via the one or more ports (e.g., a gas encapsulated within glass bubbles, a gas captured as bubbles within the liquid, or the like).

Similarly, the term "substantially only a liquid" or "substantially only the liquid" or the like means less than an entirety of the volume of the container may be filled by the liquid. For example, some portion of the volume container can contain the gas as discussed above. According to one embodiment, "substantially only a liquid", "substantially only the liquid" or the like means that 95% or more of the volume of the container is filled by the liquid. According to further embodiments, 97% or more of the volume of the container is filled by the liquid. According to yet further embodiments, 99% or more of the volume of the container is filled by the liquid. According to yet further embodiments, 99.5% or more of the volume of the container is filled by the liquid.

According to one embodiment, the gas is present in the volume defined by at least a portion of the lid and inner liner prior to filling of the volume with the liquid. It is therefore desirable to remove the gas from the volume such that substantially only the liquid remains within the volume. Contemplated steps for the removal of substantially all the gas from the volume of the container include at least one of applying a first pressure on a surface of the inner liner external to the volume to partially collapse the inner liner and applying a second pressure to the one or more ports to draw the gas through the one or more ports, for example. The second pressure can be a pressure that is less than a pressure within the volume, for example, the second pressure can be a vacuum. Applying the first pressure to the surface of the inner liner external to the volume can include one or more of filling the outer housing of the container with a fluid or gas and contacting the surface of the inner liner with a mechanical feature such as a member. Other contemplated embodiments for the removal of substantially all the gas from the volume of the container will be discussed subsequently.

According to some embodiments, in addition to the inner liner and the lid, the container can be comprised of the outer housing. The outer housing can in the form of a cup that can be rigid. The outer housing can at least partially surround and house the inner liner and can be coupled to the lid, for example, by a ring. In some embodiments, the inner liner can be flexible (e.g., a bladder) so as to be collapsible and expandable. Thus, the inner liner can collapse as the liquid is pumped from the container.

In some embodiments, the lid can include an integrated pump cap. The integrated pump cap can integrate a pump into the lid. The pump can comprise a G-rotor pump, a peristaltic pump, a syringe pump, or an elastomeric diaphragm pump, for example. The pump can be used to dispense a specific amount of the liquid from the container when operated. When dispensed in this manner, the liquid can pass through one (or more) of the one or more ports (e.g., an outlet port), for example. However, in other embodiments the liquid can be dispensed through a dedicated outlet port that is not one of the one or more ports used for filling of the container with the liquid or removing the gas.

Other aspects of the present disclosure are directed to a method of filling the container with substantially only the liquid where the gas has been removed from the volume (or was never present in the volume) prior to the filling. For example, the inner liner can be flexible so as to be substantially fully collapsed prior to filling such that substantially no gas is present in the volume defined by the flexible liner and the lid. Thus, filling the volume with substantially only the liquid via one or more ports that communicate with the volume can occur sequent to collapsing the flexible liner. In other embodiments, no flexible liner may be present and the gas can be removed prior to filling (e.g., by creating a vacuum in the container).

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Aspects of the present disclosure relate to devices, systems and methods for the containment of liquids. The disclosed methods facilitate the filling a container with substantially only the liquid(s) desired. The method can include the removal of a gas from the container prior to, during or after the filling of the container with the liquid. Thus, in some embodiments the method includes removing of the gas from the container such that substantially only the liquid remains within the container. Further embodiments are discussed herein and in reference to various of the FIGURES.

Figure 1:
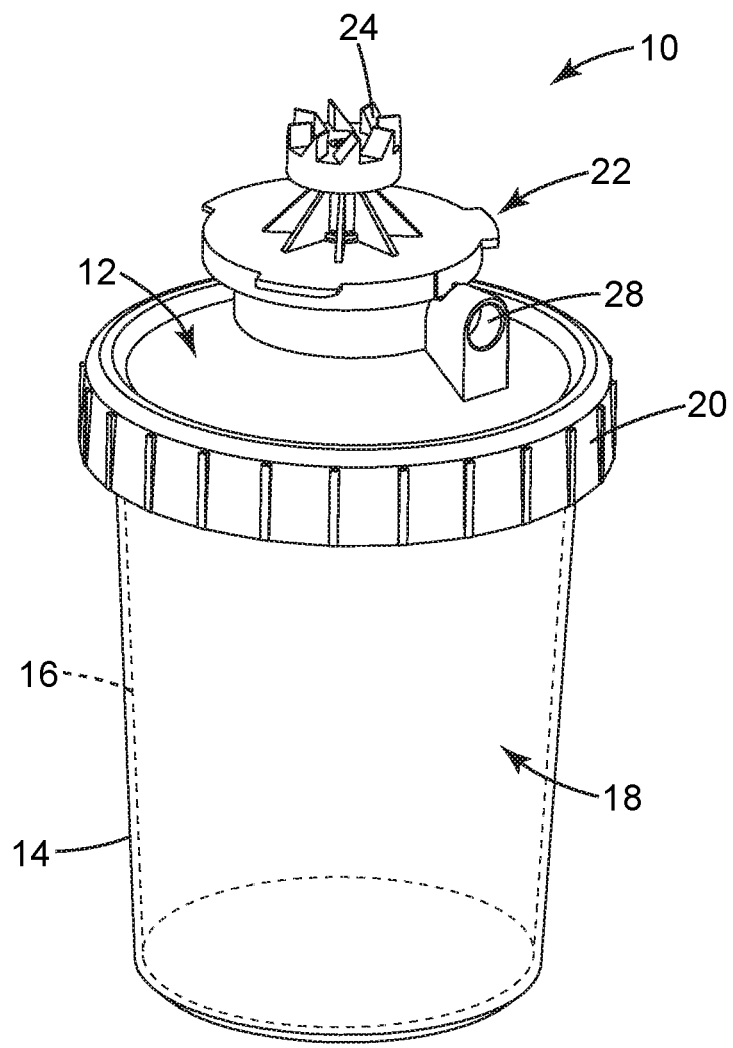
FIG. 1 is a perspective view of a container with a lid and a housing according to an example of the present disclosure.

As a point of reference, FIG. 1 illustrates an example container 10 that includes a lid 12, an outer housing 14 and an inner liner 16 (shown in phantom in FIG. 1). The outer housing 14 can be a rigid component and can be a reusable and/or disposable part of the container 10. The outer housing 14 can be configured to couple with the lid 12 and surrounds and receives at least a portion of the inner liner 16. Thus, the inner liner 16 can be positioned within the outer housing 14 upon assembly. The inner liner 16 can be comprised of a flexible material (e.g., a rubber, flexible plastic film such as low density polyethylene (LDPE), for example) so as to be collapsible and expandable. Thus, a volume 18 defined by the inner liner 16 and the lid 12 can be changeable in size in some embodiments with the collapse and expansion of the inner liner 16. According to further embodiments, the inner liner 16 can be removable from the outer housing 14 and the lid 12 so as to be disposable.

The outer housing 14 can provide structural stability when the container 10 is transported or otherwise used. According to the illustrated embodiment, the outer housing 14 is removably coupled to the lid 12, for example, using a threaded ring 20. The threaded ring 20 can be integral to the lid 12 or can comprise a separate piece. Threads on ring 20 can be either male or female with the complementary mating threads formed on the outer housing 14. The threaded ring 20 can also be used to maintain the position of the lid 12 on the container 10. Although the threaded ring 20 is illustrated in FIG. 1 for removably coupling lid 12 to the outer housing 14, other coupling mechanisms may be employed such as, for example, a bayonet connector, snap tabs or snap wings, and the like, which may be useful for providing a "quick connect" capability. Alternatively, the lid 12 can be coupled to outer housing 14 by an interference or friction fit between these two components.

Figure 2:
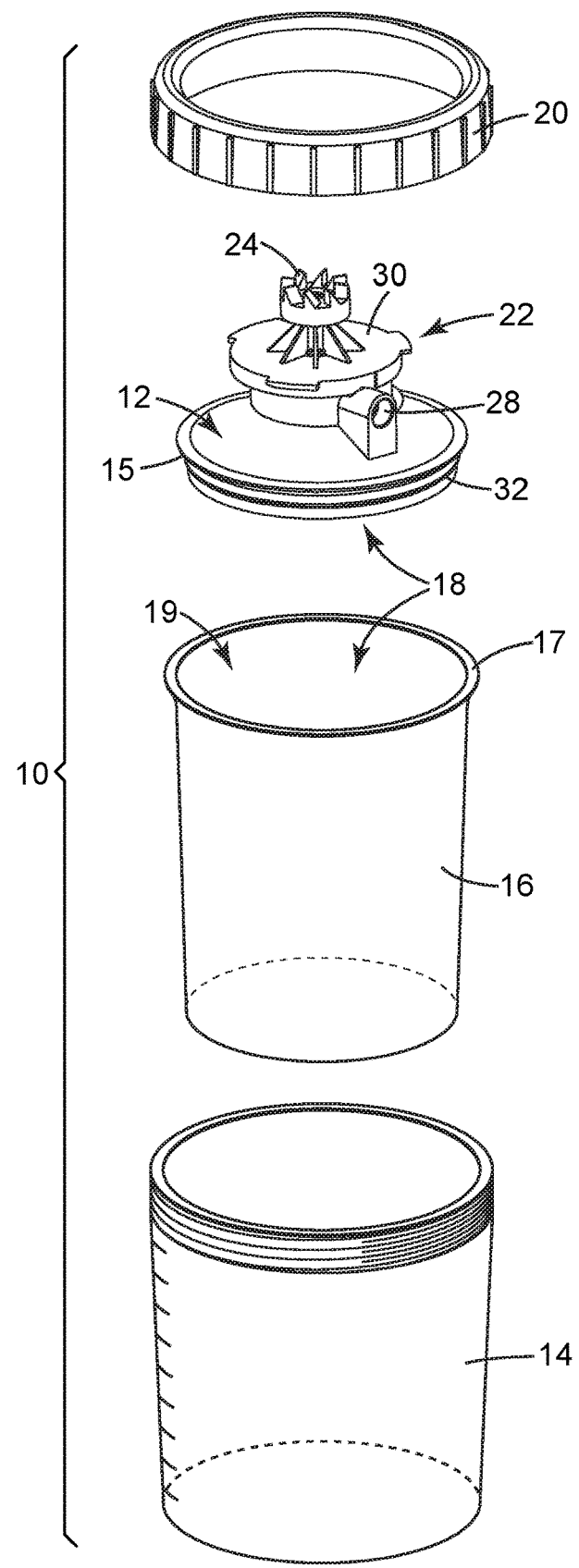
FIG. 2 is an exploded view of the container showing the lid and housing from FIG. 1 and also illustrating an inner liner and ring according to an example of the present disclosure.
Figure 3:
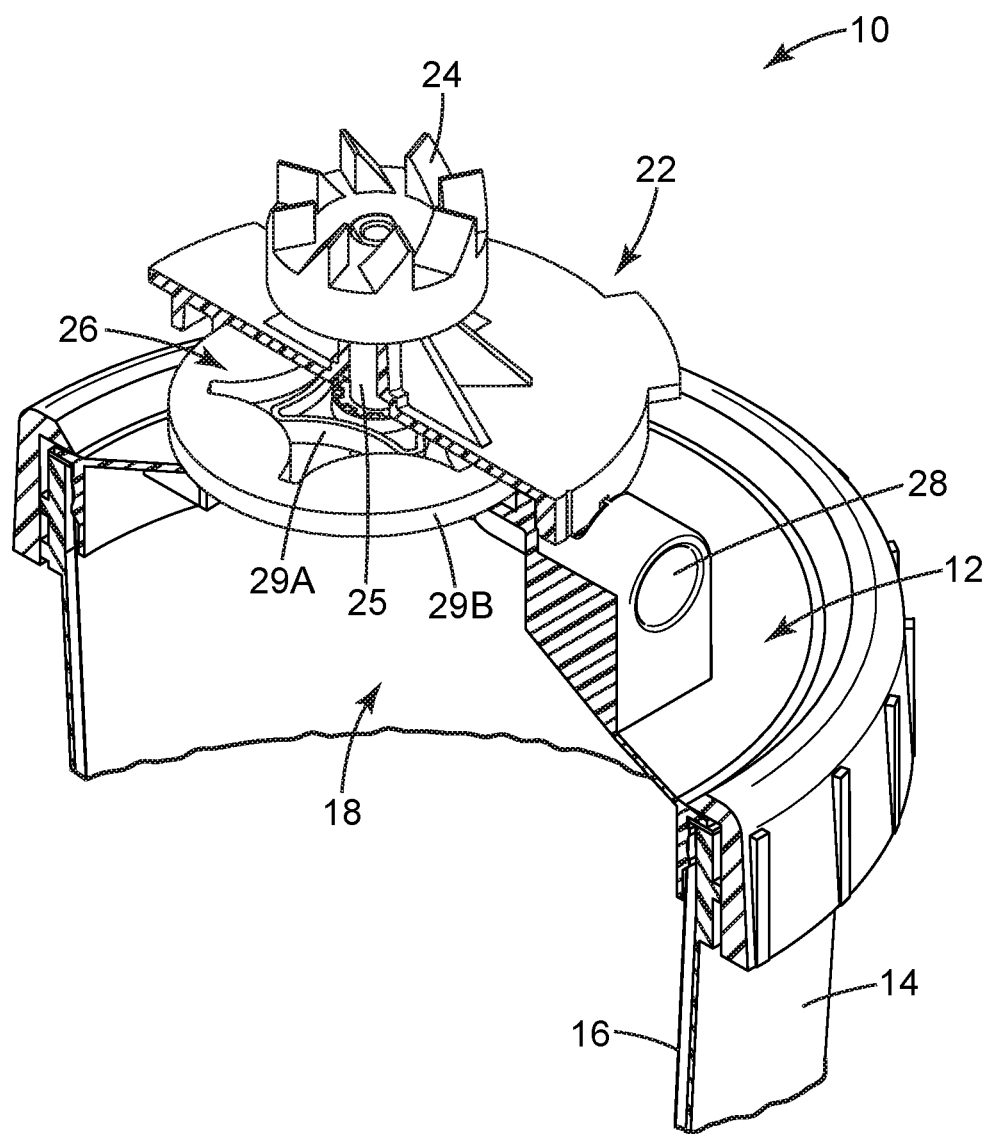
FIG. 3 is a partial cutaway of the lid showing a pump and integrated pump cap according to an example of the present disclosure.

According to the embodiment shown in FIGS. 1-3, the container 10 can include an integrated pump cap 22 as part of the lid 12. This integrated pump cap 22 includes a motor coupler 24 that, in the illustrated embodiment, rotates about a central axis in response to a corresponding rotation of a drive component in a dispenser (not shown). As shown, the motor coupler 24 includes a number of teeth that can engage a corresponding set of teeth in the motor base 24. Thus, when the motor drives a rotational drive shaft coupled by the teeth to the motor coupler 24, the motor coupler 24 is rotated to drive the pump 26 (FIG. 3) so that contents of the container 10 can be dispensed through an output port 28 in the lid 12. The teeth can be shaped to facilitate transfer of energy from the motor to the pump 26 (FIG. 3). Numerous variations on this approach are possible. For example, motor base (not shown) and the motor coupler 24 can have the same number of engagement teeth or a different number of engagement teeth, or they may interact without the use of gears that mesh such as by frictional engagement or magnetic coupling. For simplicity and ease of design, it is preferred to have the motor transfer rotational energy to the driveshaft but linear energy transfer can be used too via, for example, a rack and pinion mechanism. Advantageously, pump cap 22 may be readily disassembled from the motor base and/or lid 12 without using tools so as to facilitate cleaning and installation of a different container 10.

Referring now specifically to FIG. 3, the drive motor can be coupled to the integrated pump cap 22 in order to drive the pump 26 to dispense a specified amount of the liquid. In some embodiments, a G-rotor pump is integrated into the cap 22 of lid 12 in order to pump the liquid, in response to the driving motor. However, many other types of pumps may be readily integrated into the integrated pump cap 22 depending on the nature of the material to be pumped and other application-specific considerations (e.g., cost, efficiency, accuracy, size, weight, whether moving parts can be incorporated into the cap or should be isolated away from the cap, etc.) such as a peristaltic pump, a syringe pump, or an elastomeric diaphragm pump.

FIG. 3 shows a cutaway view of the integrated pump cap 22 to illustrate additional details. The cutaway view shows the motor coupler 24 and the output port 28. In the example of FIG. 3, the pump 26 can be formed from metal, plastic, other materials, or combinations thereof. For example, in some implementations, the pump housing is molded or otherwise fabricated from glass-filled nylon, and the gears are molded or otherwise fabricated from a polytetrafluoroethylene (e.g., Teflon™)-impregnated acetal. The pump 26 has controlled rotation such that precise amounts of the liquid from the container 10 are dispensed through the output port 28. In some embodiments, the integrated pump cap 22 is mounted to the motor such that the motor coupler 24 is coupled to the motor at an upward orientation with the remainder of the container 10 below the pump 26. However, such orientation is not always necessary. For example, the majority of the container 10 can be positioned above the pump 26 such that the liquid is gravitationally directed to an input of the pump 26. Other embodiments are also contemplated. In some embodiments, the liquid can be dispensed from the container 10 by methods other than the pump 26. For example, such methods can include pressurizing the container (e.g., pressurizing the space between an outer container and an inner liner), installing a siphon tube that extends from output port 28 to the bottom of the container, or by using a bladder or other mechanism that expands to expel liquid from the container.

As shown in FIG. 3, the motor coupler 24 is coupled to a shaft 25. The shaft 25 is further coupled to an inner or first rotor 29A. The pump 26 includes an inner rotor 29A that sits off center within and engages an outer or second rotor 298. As the motor coupler 24 is turned by the motor (not shown), the shaft 25 rotates. Rotation of the shaft 25 causes the inner rotor 29A to rotate within the outer rotor 29B. The outer rotor 29B has more slots than the number of rotor lobes on the inner rotor 29A such that the inner rotor 29A rotates in an eccentric manner with the outer rotor 29B. This rotation is such that in a first position an input port is exposed allowing fluid to flow from the container into a space between the lobes of the inner rotor 29A. As the inner rotor 29A and outer rotor 29B continue to rotate, an output is exposed between the lobes and the liquid is pushed out of the pump through output port 28. The outer rotor 29B revolves at a slower rate than the inner rotor 29A, thereby rotating and changing the volume of the chambers created by the slots.

The pump 26 can be reversible allowing liquid to be pumped from outside the container 10 through the output port 28 (which in this configuration may be regarded as an input port) and into the container 10. However, in other embodiments, the pump can be non-reversible such that the liquid can only be pumped out of the container. The pump 26 can also be configured to allow the gas to pass through the volume between the inner rotor 29A and the outer rotor 298 to reach the outlet port 28. The flow of such gas can be either be into the container 10 or out of the container 10 as will be further discussed subsequently.

Now referring to FIG. 2, the integrated pump cap 22 includes a pump cap housing 30, and a container coupler 32 (as part of or separate from the housing 30) in addition to the output port 28, and the motor coupler 24. The pump cap housing 30 may be formed as a single piece or as a combination of pieces that are removably attached together or that are fixed together (e.g., by sonic welding). For example, a portion of the pump cap housing 30 can be configured to fit the remainder of the container 10 (either the outer housing 14 and/or the inner liner 16).

According to some embodiments, a portion of the lid 12 can be removed in order to form an aperture in which to couple a pump housing including the pump for dispensing the liquid from the container. In some implementations, the pump cap housing 30 includes a first portion positioned on one side of the lid aperture and a second portion positioned on the other side of the lid aperture, where the two portions are configured to engage in order to lock the portions together and to the lid. An o-ring or other seal or gasket can be positioned between the lid 12 and a portion of the pump cap housing 30 to prevent liquid leaks. In some alternative implementations, the pump cap housing is joined to the lid (e.g., by sonic welding or using an adhesive) to bond the pump cap housing to the lid. In yet other embodiments, the pump cap housing 30 can be integrally formed with the lid 12 for closing the container.

The container coupler 32 allows the integrated pump cap 22 to attach to the container 10. In the embodiment of FIG. 2, the container coupler 32 is in the form of male or female threads that join with complementary threads formed on the container 10. In other implementations, the container coupler 32 is configured to provide an interference or friction fit with the container. In still other embodiments, the container coupler 32 may be a bayonet connector, snap tabs, snap wings or the like (with complementary engaging structure formed on the container), which may be useful for providing a "quick connect" capability. Alternatively, the container coupler 32 may be provided as a weld (e.g., a sonic weld) or as an adhesive that joins the pump cap 22 to the container 10. As previously described, the output port 28 is configured to output liquids from the container 10 as driven by the pump 26.

Still referring to FIG. 2, the lid 12 can be coupled to the rigid outer housing 14 and/or the flexible inner liner 16. Additional stability can be obtained by, for example, forming the inner liner 16 with a rim 17 at an open end 19 that rests on the upper edge 15 of the outer housing 14. Securing the lid 12 to the outer housing 14 by the techniques mentioned above may compress the rim of the inner liner 16 between the upper edge of the outer housing 14 and the lid 12. If the lid 12 is coupled to the inner liner 16 this may be accomplished by a friction fit between the lid 12 and the inner liner 16 or by sealing the lid 12 to the inner liner 16 using, for example, sonic welding or an adhesive According to some embodiments, the outer housing 14 may contain a gas hole comprising a vent that remains open, or alternatively, that can be opened and closed as desired. If closure is desired, a strip of tape or a valve can be utilized to close the vent. In this manner, when the gas hole is open, the inner liner 16 may collapse as liquid is pumped from the container 10 thereby facilitating dispensing the liquid. Thus, the inner liner 16 in combination with the lid 12 provides the volume 18 that is a sealed liquid container. The volume 18 can collapse as the liquid is dispensed and can expand as the liquid is pumped or otherwise provided to the volume 18. This construction allows for an air tight dispensing that reduces the risk of contamination to the liquid. For example, some liquids contemplated to be housed within the volume 18 can react with oxygen, (e.g., the liquids can cure when exposed to air). Additionally, the sealed construction can reduce the chances that the liquid escapes from the container and contaminates the surroundings. Other liquids can easily be contaminated by particulates in the air which can impair their function and also interfere with the dispensing. As previously discussed, the inner liner 16 can be composed of various flexible materials, for example, LDPE.

Although the container 10 is described as including an outer housing 14 and an inner liner 16, it may be a single component in the form of a container without a liner or an outer housing. Thus, the inner liner can be a layer or part of the outer housing. The container that may be rigid or flexible and may contain a vent to equilibrate the pressure inside the container with atmospheric or another pressure when the vent is open as previously discussed. A flexible container may be composed of various flexible polymeric materials, for example, LDPE or, if more strength or durability is desired, an ethylene vinyl acetate (EVA) resin such as Elvax®.

Bearing in mind the configuration of the container 10, further details and alternatives are described in detail with reference to the subsequent FIGURES. For example, various methods of ensuring substantially only the liquid fills the volume within the container 10 are now described with reference to the subsequent FIGURES.

Figure 4A:
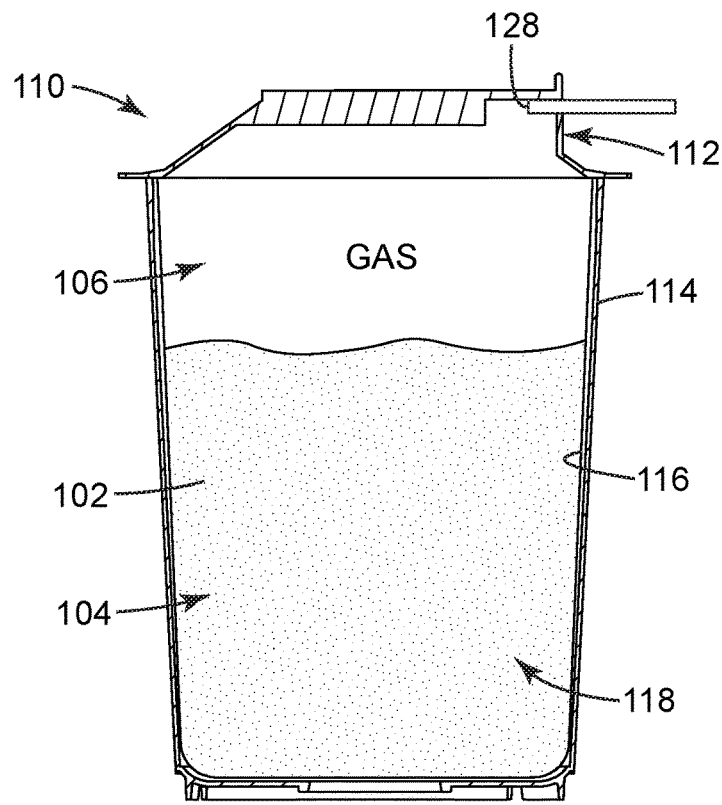
FIG. 4A is schematic view of the container similar to as previously illustrated in FIGS. 1-3 containing a liquid and gas within an inner volume defined by the inner liner and lid according to an example of the present disclosure.
Figure 4B:
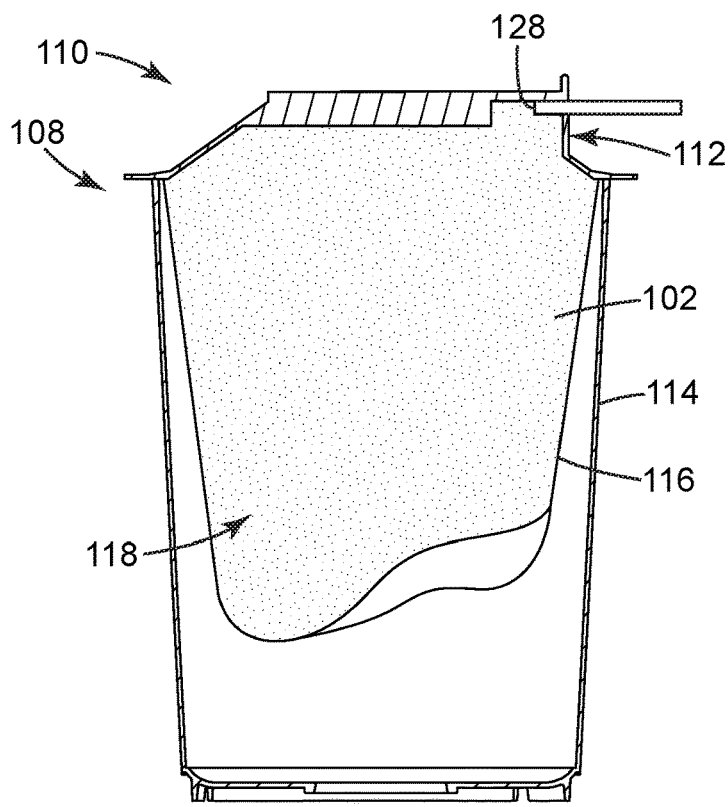
FIG. 4B is a schematic view of the container of FIG. 4A having undergone a method to remove substantially all the gas from the volume while retaining substantially only the liquid within the volume according to an example of the present disclosure.

FIGS. 4A and 4B show a container 110 such as the container 10 previously illustrated in FIGS. 1-3. As such, the container 110 includes a volume 118 defined by portions of an inner liner 116 and a lid 112. The container 110 also includes an outer housing 114. The lid 112 or other parts of the container 110 can include one or more ports 128 as will be described subsequently and for which an example includes the outlet port 28 previously described in reference to FIGS. 1-3. The one or more ports 128 communicate with the volume 118 as well as the ambient or a device (e.g., a vacuum or a part of the dispenser as described in United States Patent Application Publication No. 2013/0270303A1).

FIG. 4A shows liquid 102 (indicated as shaded) and a gas (indicated as "GAS" in FIG. 4A but simply shown in white hereinafter for brevity) are contained in the volume 118. In particular, a first portion 104 of the volume 118 contains the liquid 102 and a remaining portion 106 contains the gas. As used herein, the gas can include any gas such as air, aerosol, or an inert gas, for example. The liquid 102 can be provided to the volume 118 by a pump, for example. The liquid 102 can be any one or any combination of an adhesive, cement, colorant, coating, detergent, epoxies, dye, filler (e.g., body filler), nano-material, oil, paint (e.g., automotive paint), paste, pigment, caulk, urethane, polymer additive (which may be organic or inorganic), sealant, stain, toner, varnish, and wax as previously described. Similarly, the viscosity and/or the shear rate of the liquid 102 can vary as previously discussed. In some embodiments, components of the container 110 such as a pump of like or similar construction to the pump 26 previously described can be specifically configured to accommodate and facilitate pumping of the liquid(s) disclosed herein to dispense the liquid 102 from the volume 118.

FIG. 4B shows the container 110 having undergone a method 108 to remove substantially all the gas from the volume 118 via the one or more ports 128 while retaining substantially only the liquid 102 within the volume 118. As shown in FIG. 4B, the inner liner 116 is flexible and has at least partially collapsed in response to, to aid, or to facilitate the removal of the gas.

Figure 5:
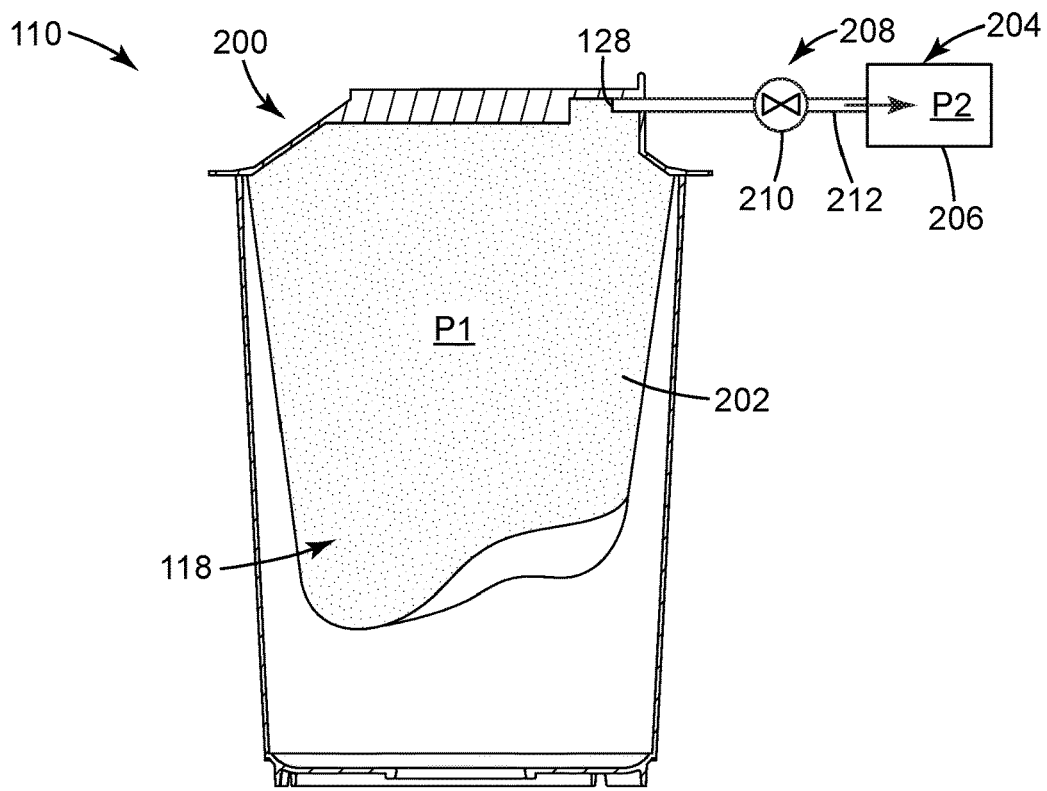
FIG. 5 shows the container of FIG. 4B undergoing the method to remove substantially all the gas from the volume while retaining substantially only the liquid within the volume by application of a pressure differential such as a vacuum that communicates with the volume according to an example of the present application.

FIG. 5 shows the container 110 undergoing one embodiment of a method 200 to remove substantially all the gas (the flow of which is indicated by arrow) from the volume 118 while retaining substantially only the liquid 202 within the volume 118. According to the embodiment of FIG. 5, a pressure differential is applied such that a pressure P1 within the volume 118 differs from a pressure P2 within a first device 204. Although indicated as a device, the first device 204 can simply be a region such as the immediate ambient around the container 110 that has a pressure differential relative to the pressure P1 of the volume 118. The volume 118 communicates with the first device 204 via the one or more ports 128. According to one embodiment, the first device 204 comprises a vacuum 206 that communicates with the volume 118 via the one or more ports 128. In other embodiments, the first device 204 need not comprise the vacuum 206 but can be a container, volume or region with a pressure differential relative to the pressure P1 of the volume 118 sufficient to cause the gas to flow from the volume 118. In further embodiments, the first device 204 can be used with a dispenser as described in United States Patent Application Publication No. 2013/0270303A1 or another device could be used to drive the pump to pump the air out in some embodiments.

As shown in FIG. 5, the container 110, the first device 204 and the other components illustrated can be part of a system 208 that includes a second device 210 to regulate communication between the volume 118 and the first device 204 (or ambient) via the one or more ports 128. For example, the second device 210 can comprise a one way valve, a check valve or the like. In other example embodiments, the second device 210 can comprise a plug or a seal such as a membrane that can be punctured (e.g. by item 212) to facilitate communication between the volume 118 and the second container 204 (or ambient). Although a regulating device such as the second device 210 is not shown or specifically described in the prior or some of the remaining embodiments, it should be recognized that such a device (e.g., a valve, a plug, a seal, or the like) can be included as desired.

FIG. 6A again shows the container 110, an example of which includes the container 10 of FIGS. 1-3 as previously discussed. The container 110 is undergoing another embodiment of a method 300 to remove substantially all the gas (the flow of which is indicated by arrow A) from the volume 118 while retaining substantially only the liquid 302 within the volume 118. According to the embodiment of FIG. 6A, a pressure differential is applied such that the pressure P1 within the volume 118 differs from a third pressure P3 within a second volume 304 defined between an outer surface(s) 306 of the inner liner 116 and an inner surface(s) 308 of the outer housing 114. This pressure differential can cause a collapse of the flexible inner liner 116 that reduces the volume 118 and displaces substantially all the gas from the volume 118 as shown.

Figure 6A:
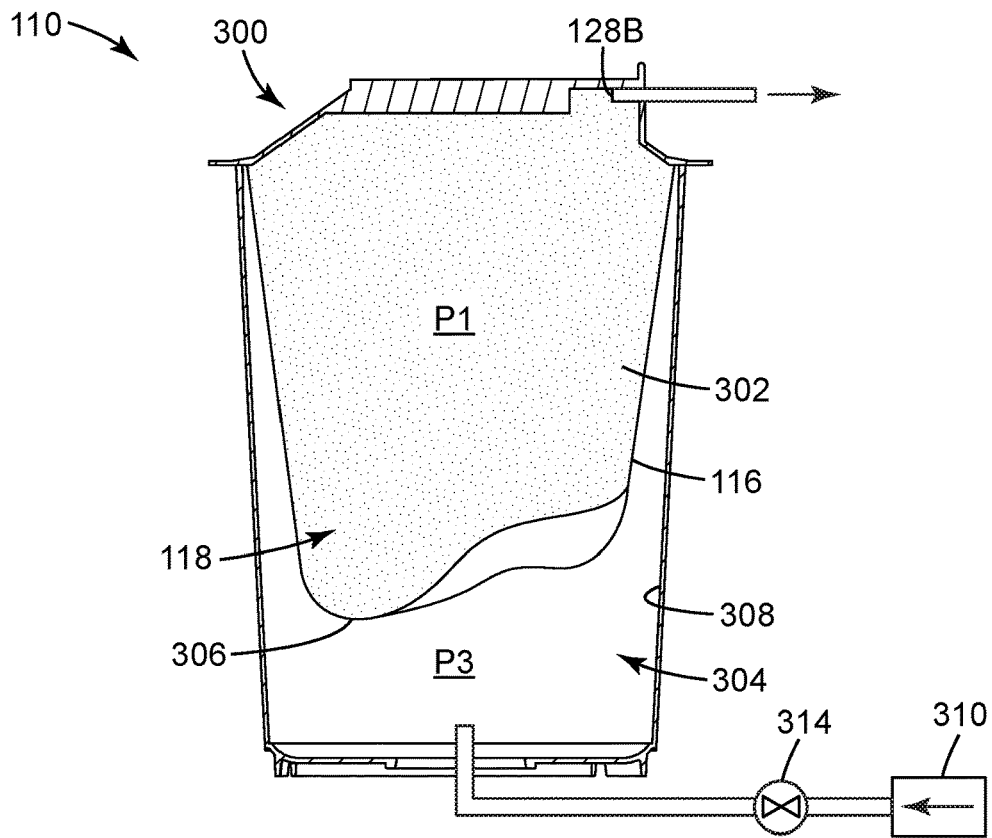
FIG. 6A shows the container of FIG. 4B undergoing the method to remove substantially all the gas from the volume while retaining substantially only the liquid within the volume by application of a pressure on the inner liner by increasing the pressure in the container in a second volume between the outer housing and on an outer surface of the inner liner, the second pressure causing collapse of the flexible inner liner to displace substantially all the gas from the volume according to an example of the present application.

As shown in FIG. 6A, the third pressure P3 can be supplied from a third device 310. The third device 310 can be a pump, blower or the like, for example. According to further embodiments, the third device 310 can simply be a region such as the immediate ambient around the container 110 that has a pressure differential relative to the pressure P1 of the volume 118. The second volume 304 communicates with the third device 310 via one or more of the one or more ports 128 (e.g., via port 128A). As shown in FIG. 6A, the port 128A can differ from an outlet port 128B from which the gas exits the volume 118. As shown, a regulating device 314 such as a valve, plug or seal (e.g. a membrane) can be utilized with the embodiment of FIG. 6A.

Figure 6B:
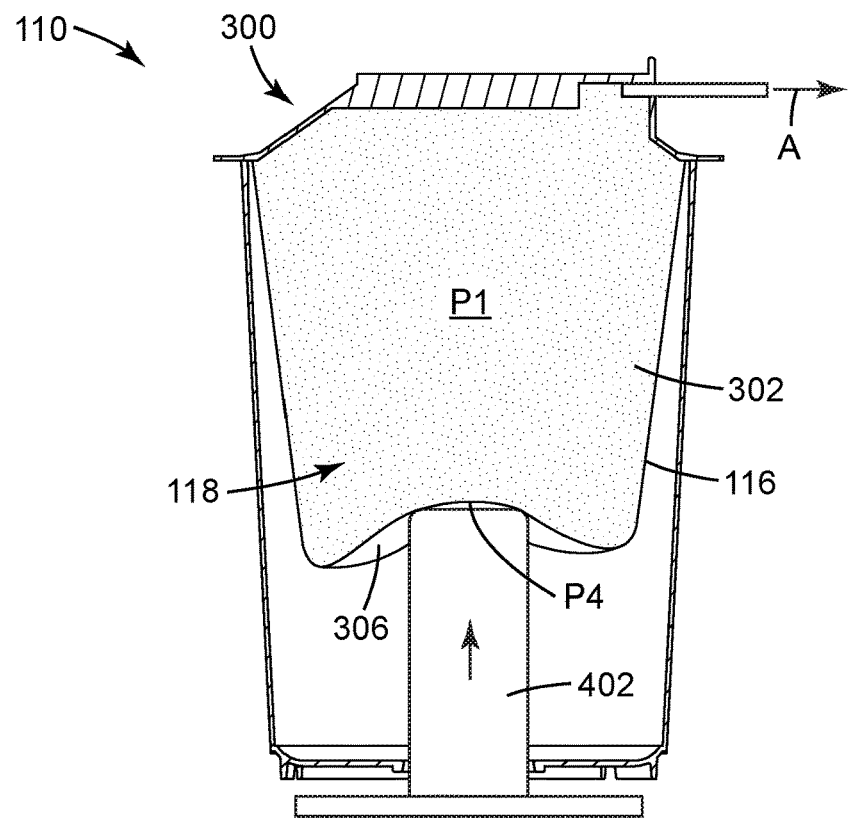
FIG. 6B shows the container of FIG. 4B undergoing the method to remove substantially all the gas from the volume while retaining substantially only the liquid within the volume by application of a pressure on the inner liner by a mechanism such as a member, the pressure causing collapse of the flexible inner liner to displace substantially all the gas from the volume according to an example of the present application.

FIG. 6B shows an embodiment of a method 400 whereby a member 402 is utilized to cause a collapse of the inner liner 116 of the container 110 that reduces the volume 118 and displaces substantially all the gas from the volume 118 as indicated by arrow A while retaining substantially only the liquid 302 within the volume 118. The member 402 is moveable to contact and apply a fourth pressure P4 to the outer surface(s) 306 of the inner liner 116 to create a pressure differential between the pressure P1 within the volume 118 and the fourth pressure P4. This pressure differential can cause at least a partial collapse of the flexible inner liner 116 that reduces the volume 118 and displaces substantially all the gas from the volume 118 as shown. Although shown as a piston type mechanism, the member 402 can comprise a spring, diaphragm, a second bladder, or another mechanism that can be deployed as needed to facilitate the collapse of the inner liner 116.

Figure 7:
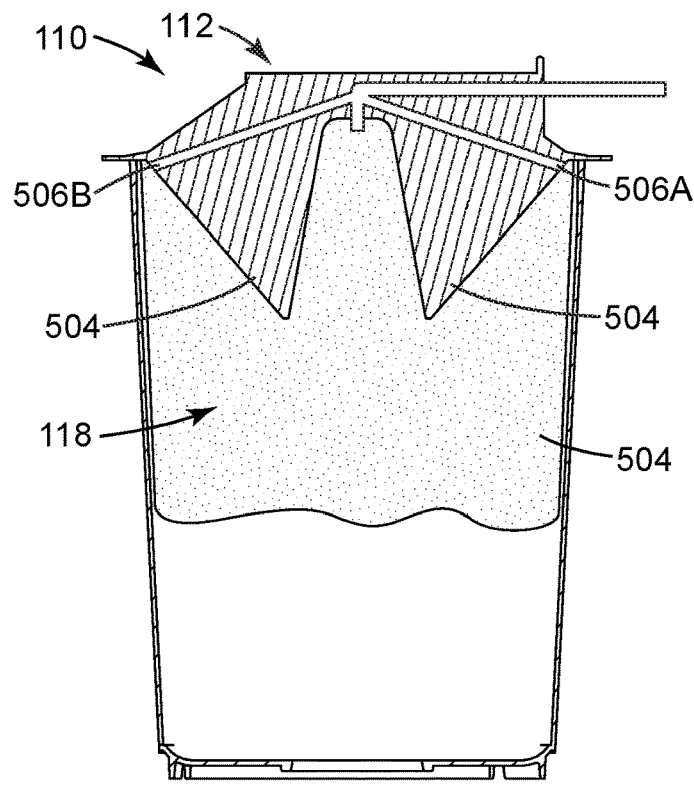
FIG. 7 shows the container of FIG. 4B undergoing the method to remove substantially all the gas from the volume while retaining substantially only the liquid within the volume by application of a lid specifically designed to displace substantially all the gas from the volume when coupled to the remainder of the container according to an example of the present application.

FIG. 7 shows an embodiment of a method 500 whereby the lid 112 of the container 110 has been modified in a manner so as to be configured to displace the gas and the liquid 502 as desired. In particular, the gas can be displaced so as to be substantially removed from the volume 118 while substantially only the liquid 502 is retained within the volume 118 when the lid 112 is coupled to the housing 114 to form the container 110. According to FIG. 7, the lid 112 has been provided with a projection 504 so as to extend downward into the volume 118 when the lid 112 is disposed on remainder of the container 110. Ports 506A, 506B (others not shown) comprising some of the one more ports facilitate movement of substantially all the gas from the volume 118 upon coupling of the lid 112 to the remainder of the container 110.

It should be recognized the geometry of the lid 112 can be configured in other manners in keeping with the enclosed teachings so as to facilitate removing substantially all the gas from the volume 118 while retaining substantially only the liquid 502 within the volume 118. For example, the lid 112 may not project down into the volume 118 in the same manner as shown in FIG. 7 but the method can rather rely on precise filling of the volume 118 with the liquid 502 taking into account any displacement that would result due to the lid 112.

Figure 8A:
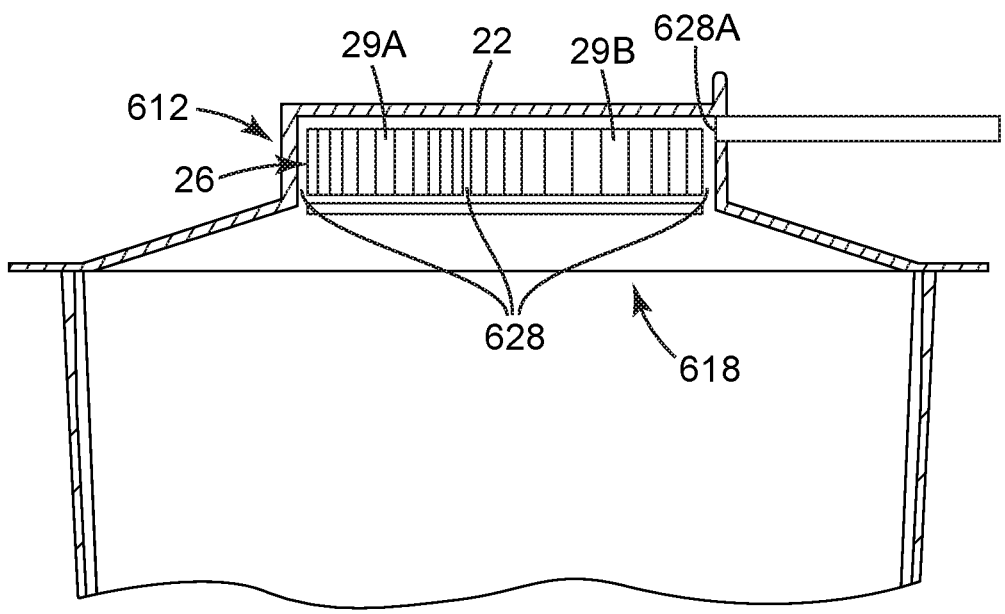
FIG. 8A shows gears or rotors of a pump can form one or more of the one or more ports to allow substantially all the gas to pass therethrough during the method to remove substantially all the gas from the volume according to an example of the present application.
Figure 8B:
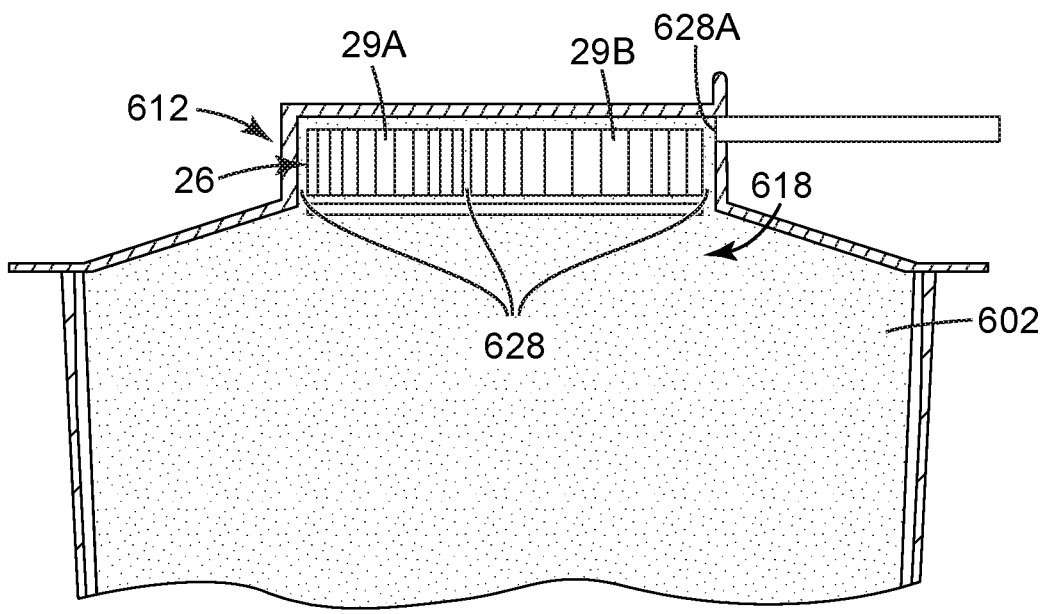
FIG. 8B shows the gears of the pump of FIG. 8A are primed by the liquid during the method to remove substantially all the gas from the volume while retaining substantially only the liquid within the volume according to an example of the present application.

FIGS. 8A and 8B show an enlargement of a lid 612 constructed in a manner identical to that of the lid 12 of FIGS. 1-3. Thus, the lid 612 can include the integrated pump cap 22 and the pump 26 as previously described. The pump 26 has the rotors 29A and 29B. The volume between the rotors 29A and 29B and between the rotors 29A and 29B and the lid housing 612A can define separate of one or more ports 628 that communicate with the volume 618 (only a portion of which is shown in FIGS. 8A and 8B).

As shown in FIG. 8A, the one or more ports 628 can allow for the passage of substantially all the gas to an outlet port 628A. FIG. 8B shows that the one or more ports 628 can also be configured to allow for passage of the fluid 602 to the outlet port 628A. In some cases, the pump 26 can be driven to turn the rotors 29A and 29B to facilitate the passage of the liquid 602 through the one or more ports 628. In this manner the pump 26 can be primed with the liquid 602. Furthermore, the liquid 602 can be tailored so as to effectively form a seal in the one or more ports 628 or at the outlet port 628A against the ambient if desired. For example, the rheology of the fluid may be tailored such that the viscosity of the fluid is low during flow into the pump (priming) (e.g., at a higher shear rate), then the viscosity increases after the fluid has stopped flowing into the pump (e.g., at a lower shear rate), thereby preventing the gas from re-entering the container. This same mechanism can be used for several of the above embodiments where the gas is removed by vacuum or higher external pressure to push the air out through the pump, vent, or other small orifice. The fluid properties can be tailored such that the fluid seals the pump, vent, or other small orifice. In other embodiments, the gap sizes can be adjusted in the pump to increase the resistance to gas re-entering the container (smaller gap size results in higher resistance to flow). Thus the fluid properties and/or gap sizes can be adjusted by one skilled in the art to provide sufficiently easy removal of gas/priming of pump (e.g., low resistance to flow) and sufficiently difficult re-entry of gas back into the container (e.g., high resistance to flow).

Figure 9A:
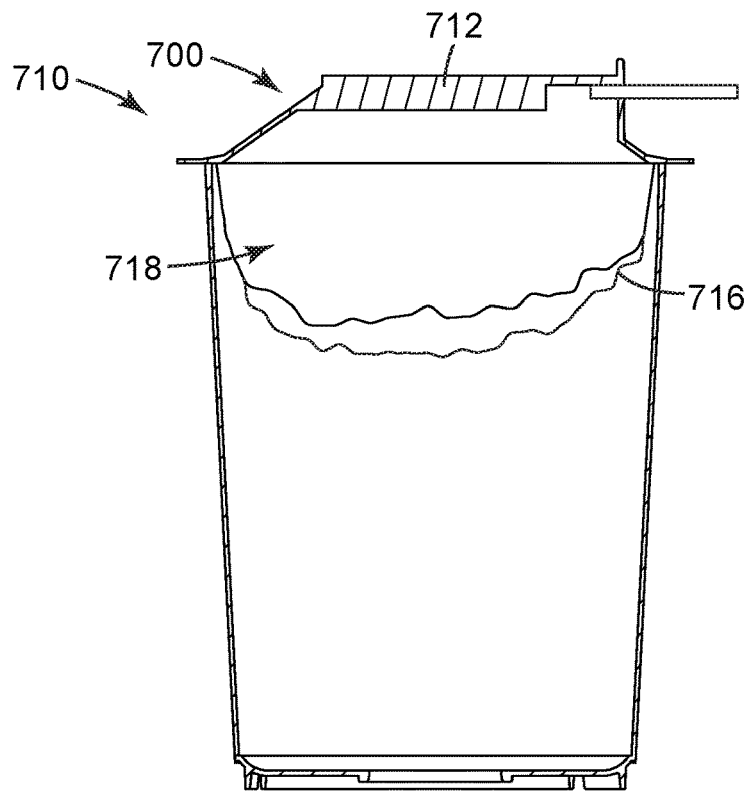
FIG. 9A shows a method of filling a container with substantially only a liquid according to another example of the present application where a flexible liner of the container is substantially fully collapsed such that substantially no gas is present in the volume prior to filling the volume with substantially only the liquid.
Figure 9B:
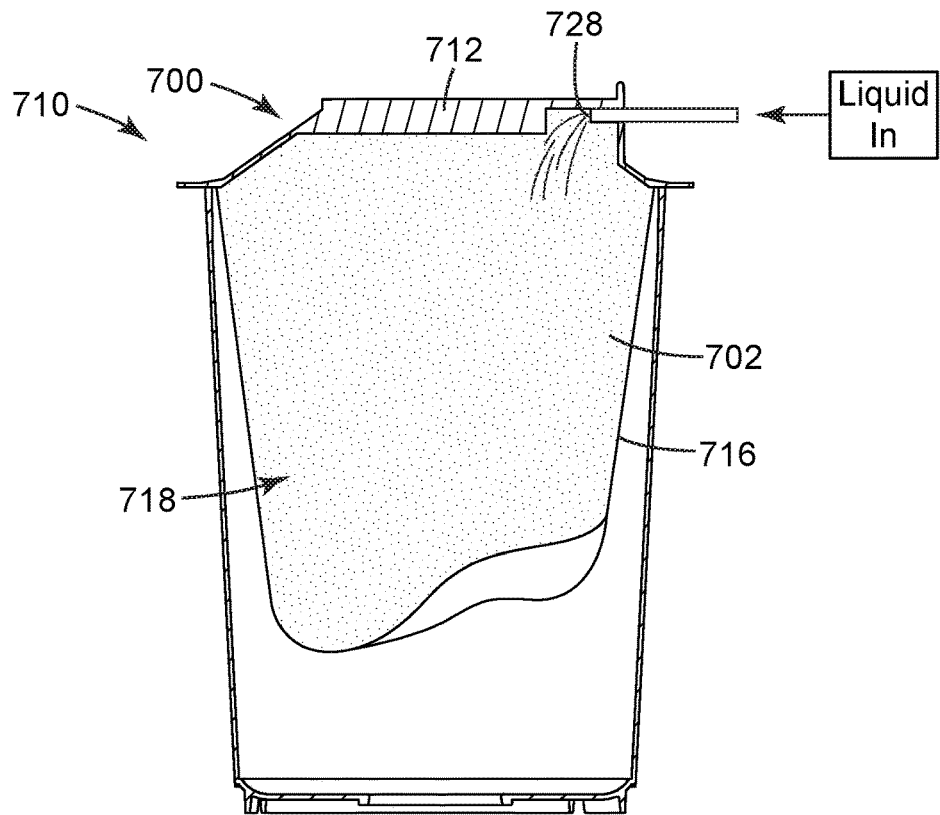
FIG. 9B shows the method of FIG. 9A undergoing the filling of the volume with substantially only the liquid.

FIGS. 9A and 9B shows another method 700 whereby a container 710 has been provided with an inner liner 716 and a lid 712 that define a volume 718. FIG. 9B shows the method 700 where the container 710 and the inner liner 716 are partially filled during a filling process. The inner liner 716 is flexible as previously discussed such that the method 700 substantially fully collapses the inner liner 716 in a manner that leaves substantially no gas is present in the volume 718 as shown in FIG. 9A. Sequent to collapsing the inner liner 716, the method 700 fills the volume 718 with substantially only a liquid 702 via one or more ports 728 that communicate with the volume 718 as shown in FIG. 9B. Put another way, the method 700 utilizes a pre-collapsed inner liner 716 that forms the volume 718 with substantially no gas therein as shown in FIG. 9A. The method 700 then fills the inner liner 716, which expands in response, with substantially only the liquid 702 as shown in FIG. 9B.

FIGS. 10-13 show various designs for the one or more ports that can allow for simultaneous filling of the volume defined by the inner liner and the lid with the liquid while also venting the gas from the volume.

Figure 10:
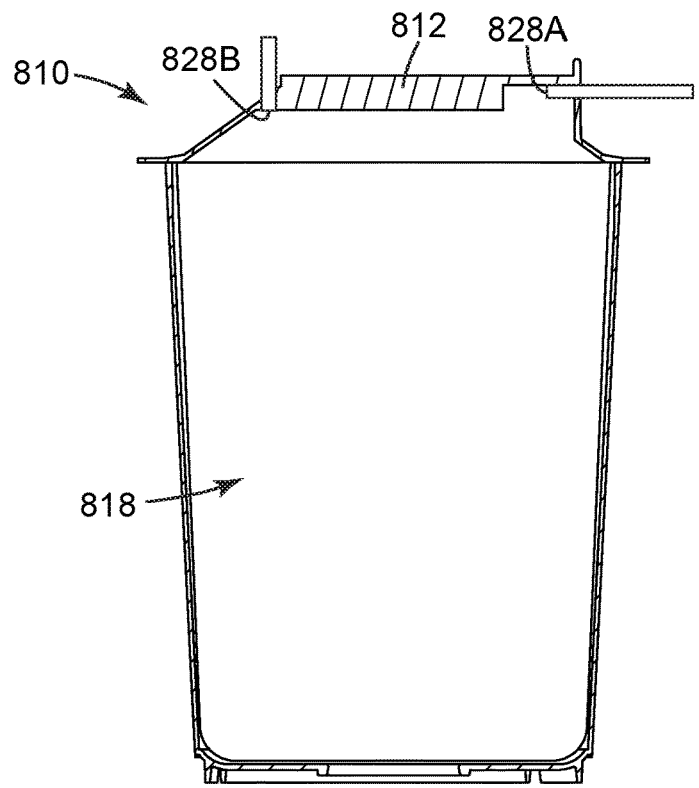
FIG. 10 show another example of the container that allows for the method of filling the container with substantially only the liquid, the method provides at least one of the one or more ports comprises a vent for venting the gas from the volume according to an example of the present application.

For example, FIG. 10 shows a lid 812 having a first port 828A in the manner previously discussed similar to ports 28 and 128. The first port 828A can be used to receive a liquid 802 and to dispense the liquid 802 according to embodiment of FIG. 10. A second port 828B has been provided for venting of the gas from a volume 818. However, in other embodiments, such as the embodiment of FIG. 11, the first port 828A can be used for venting substantially all the gas from the volume 818 and the second port 828B can be used for filling with the liquid 802.

Figure 11:
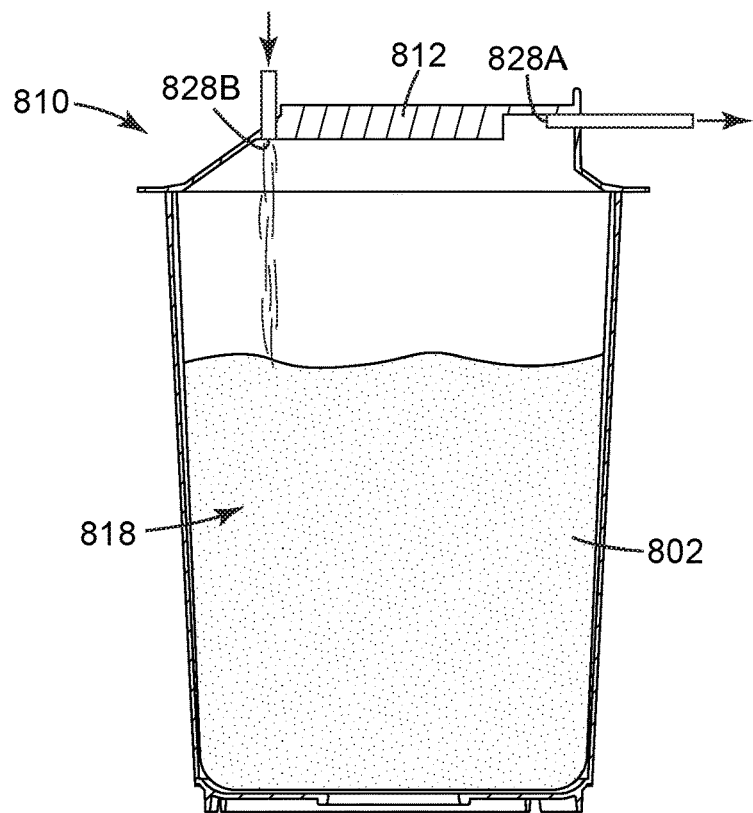
FIG. 11 shows the container of FIG. 10 being simultaneously filled with the liquid and having the gas vented from the volume via at least one of the one or more ports according to an example of the present application.

According to the embodiments of FIGS. 10 and 11, at least one of the first port 828A or the second port 828B that is used for venting can be positioned to communicate with substantially a last to fill location for the liquid 802 contained by the volume 818. Thus, in FIG. 10, the second port 828B is positioned at or adjacent substantially a highest point of the container 810 on the lid 812.

Figure 12:
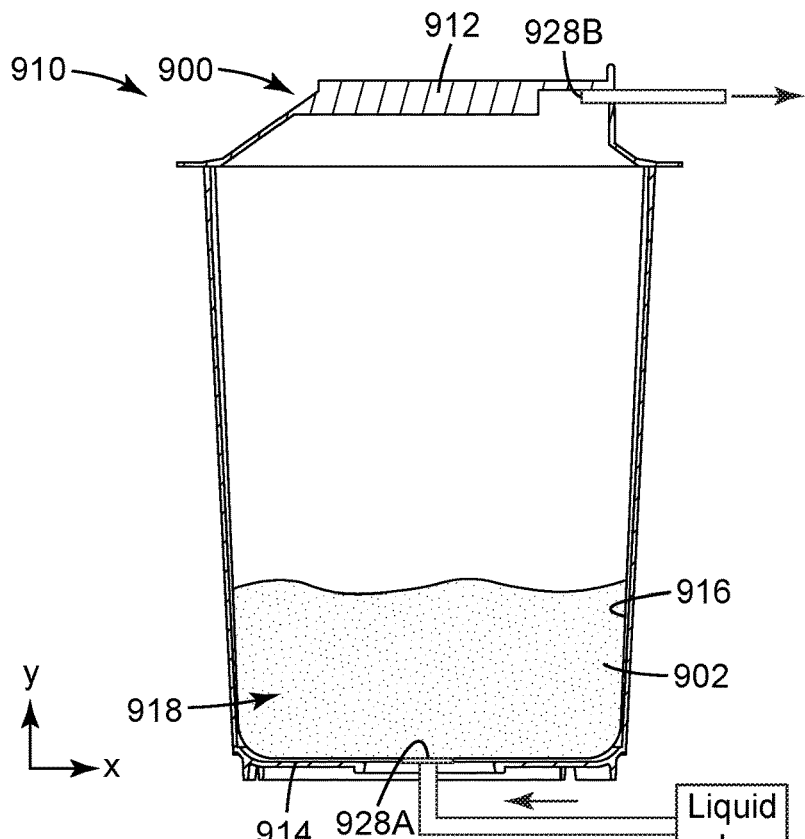
FIG. 12 shows an alternative embodiment of the container of FIGS. 10 and 11 where the container has a first port of the one or more ports for filling of the volume with substantially only the liquid and has a second port of the one or more ports for venting the gas vented from the volume according to an example of the present application.

FIG. 12 shows yet another embodiment of a container 910 used with a method 900. The container 910 has two or more ports that are used according to the method 900 for simultaneous filling of the volume with a liquid 902 and for venting of a gas from a volume 918. In the embodiment of FIG. 12, a first port 928A communicates with an inner liner 916 at a relatively lowest point of the inner liner 916 (corresponding to a relatively lowest point of the volume 918 defined by the inner liner 916 and a lid 912). Rather than the flexible inner liners previously described, the inner liner 916 can be constructed of a rigid or semi-rigid material so as to substantially maintain a desired shape and have a desired volume throughout the filling and venting process in some cases. In other cases, a flexible inner liner such as those previously described can be utilized. As shown in FIG. 12, the first port 928A receives the liquid 902, which can be pumped or can otherwise be made to flow into the volume 918 through an outer housing 914 as well as the inner liner 916. Simultaneous with filling of the liquid 902, the gas can be vented from the volume 918 via a second port 928B. According to the embodiment of FIG. 12, the second port 928B can be positioned to communicate with substantially a last to fill location for the liquid 902 contained by the volume 918. Thus, in FIG. 12, the second port 928B can be positioned at or adjacent substantially a highest point of the container 910 on the lid 912.

Figure 13:
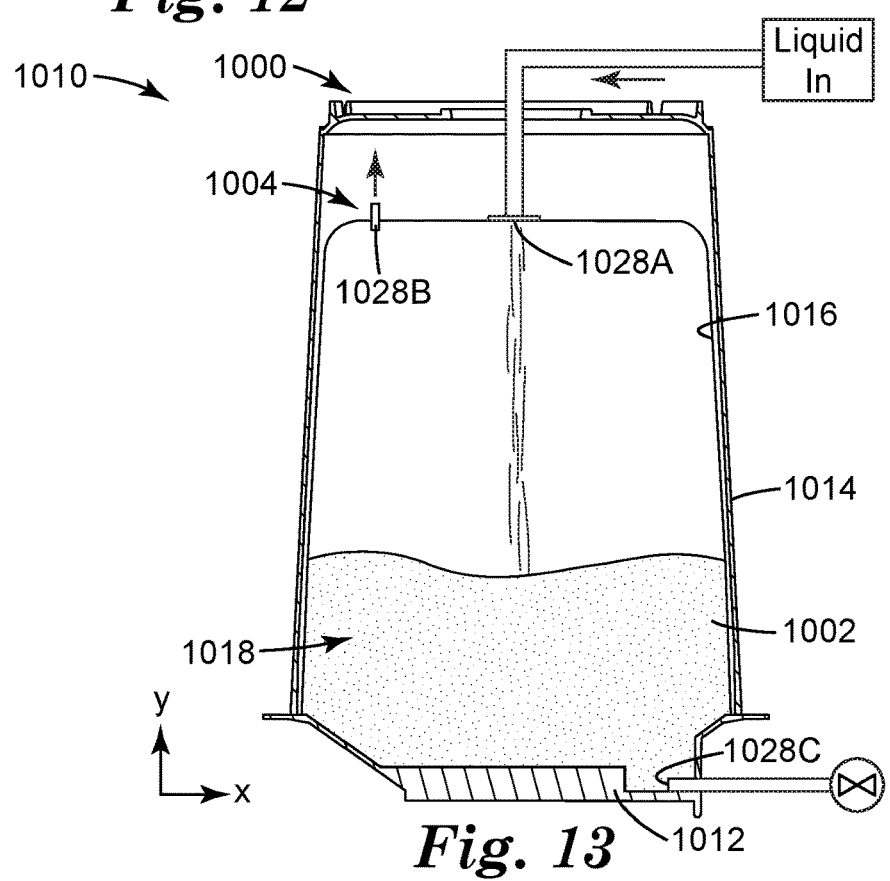
FIG. 13 shows yet another alternative embodiment of the container of FIGS. 10-12 that allows for simultaneous venting of gas from the volume and filling of the volume of the container according to an example of the present application.

FIG. 13 shows another embodiment of a container 1010 used with a method 1000. The container 1010 can have two or more ports that are used according to the method 1000 for simultaneous filling of the volume with a liquid 1002 and venting of a gas from a volume 1018. In the embodiment of FIG. 12, the container 1010 has been inverted on the x-y coordinate scheme relative to the embodiment of FIG. 11. Thus, a first port 1028A communicates with an inner liner 1016 at a relatively highest point of the inner liner 1016 (corresponding to a relatively highest point of the volume 1018 defined by the inner liner 1016 and a lid 1012). Rather than the flexible inner liners previously described, the inner liner 1016 can be constructed of a rigid or semi-rigid material so as to substantially maintain a desired shape and have a desired volume throughout the filling and venting process. In other cases, a flexible inner liner such as those previously described can be utilized. The first port 1028A receives the liquid 1002, which can be pumped or can otherwise be made to flow into the volume 1018 through an outer housing 1014 as well as the inner liner 1016. As shown in FIG. 12, simultaneous with filling of the liquid 1002, the gas can be vented from the volume 1018 to a second volume 1004 (defined between and inner surface of the outer housing 1014 and an outer surface of the inner liner 1016) via the second port 1028B. The gas can be further vented or otherwise exhausted from the second volume 1004 to the ambient as desired. According to the embodiment of FIG. 13, the second port 1028B can be positioned to communicate with substantially a last to fill location for the liquid 1002 contained by the volume 1018. Thus, the second port 1028B can be positioned at or adjacent substantially a highest point of the container 1010 on the inner liner 1016. The first port 1028A and the second port 1028B can be sealed after filling via a valve, membrane, insert, plug or the like (not specifically shown). The container 1010 can optionally be re-oriented such that an outlet port 1028C and the lid 1012 can be positioned above the outer housing 1114 and inner liner 1112. In other embodiments the container 1010 can remain in the orientation shown and can be used to dispense substantially only the liquid 1002 from that orientation.

Dispensing System and Methods Example

Figure 14:
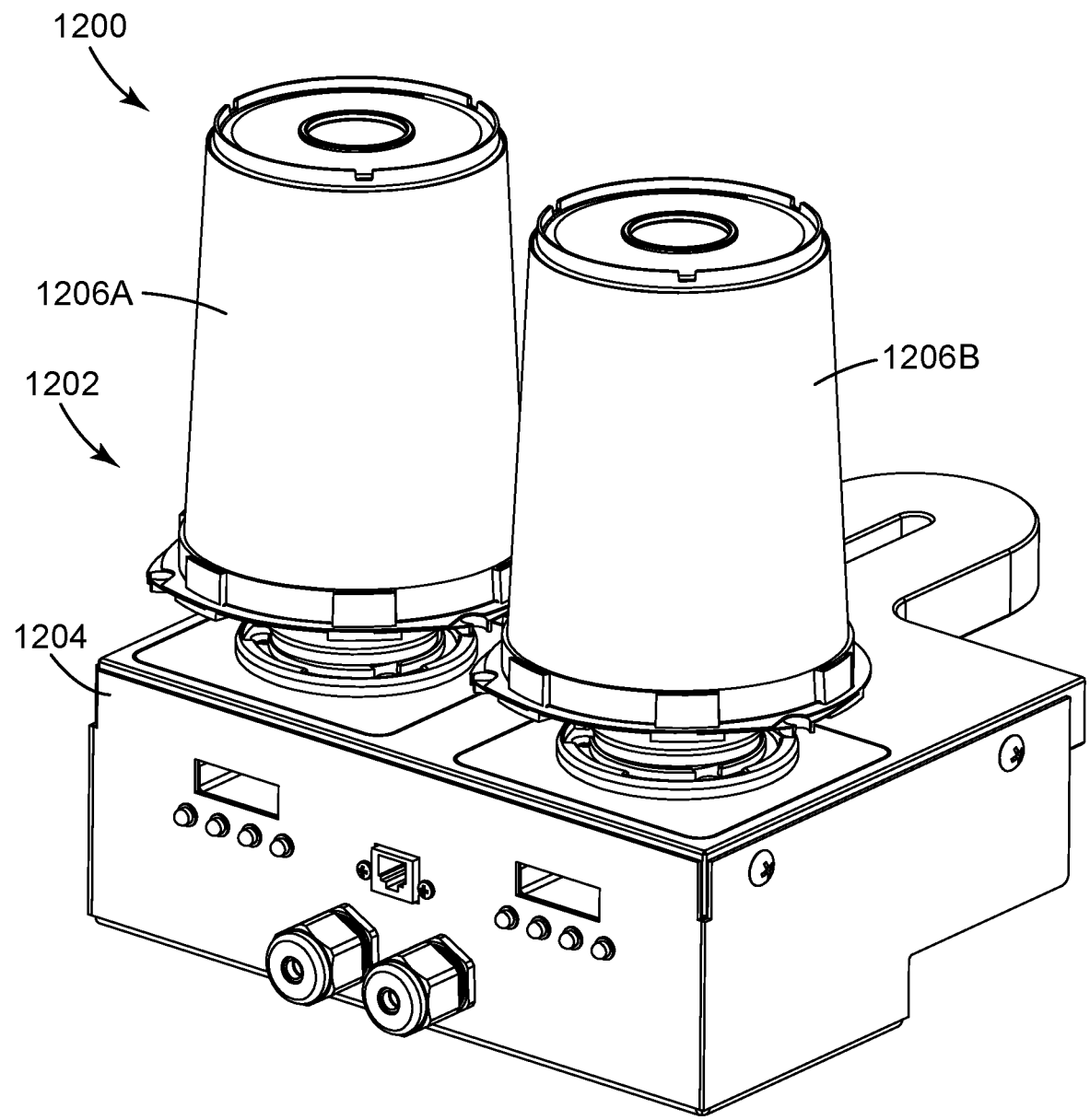
FIG. 14 shows a system that can comprise a dispenser for precise dispensing of the liquid from one or more of containers according to an example of the present application.

FIG. 14 shows a system 1200 that can include any of the containers (along with the methods) as previously described and shown. The system 1200 comprises a dispensing system 1202 for precise dispensing of the liquid as previously described from the container. According to the embodiment of FIG. 14, the dispensing system 1202 includes a motor base 1204 and two or more containers 1206A and 1206B.

According to the embodiment of FIG. 14, the motor base 1204 includes one or more motors (not explicitly shown separately) for driving the pump contained in the integrated pump cap (previously shown and described in reference to FIGS. 2 and 3) of the container. The motor can be an AC or DC electric motor (e.g., a stepper motor, servo motor, etc.) configured to drive a driveshaft that engages the integrated pump cap 106. Alternatively, the motor can be pneumatic, hydraulic, piezo-electric, mechanical (e.g., using a rack and pinion, crankshaft, cam or other similar mechanism), or hand-driven, provided that it is configured to transfer energy to a driveshaft that engages the integrated pump cap (FIGS. 2 and 3). For simplicity and ease of design, it is preferred to have the motor transfer rotational energy to the driveshaft but linear energy transfer can be used too.

The motor base 1204 can also include a programmable controller, either as a separate unit or as part of the motor itself, such that particular commands can be input in order to, for example, release a specified amount of liquid according to the command. The amount can be according to the weight of the liquid dispensed. For example, one command can cause the motor to operate such that one gram of liquid is dispensed. A second command can cause the motor to dispense two grams of liquid and so on. Thus, a particular liquid can be dispensed in different amounts depending on the application. For example, different liquid colorant amounts can be dispensed depending on the desired color and the amount of plastic material that is to be colored. In some other implementations, motor commands may be calibrated to dispense a liquid by volume rather than by weight (e.g. a programmed number of milliliters).

The controller can calculate motor driving time based on a specific flow rate of the pump for a given motor speed. This can depend on the particular liquid being dispensed (e.g., as a function of the viscosity or density of the liquid). Thus, the motor speed and flow rate can be used to calculate a motor run time to dispense a specified amount (weight or volume) of the liquid.

The motor base 1204 can include an interface for entering commands, e.g., for particular liquid dispensing. For example, one or more interface controls can allow the user to specify a particular command using menus, command codes, or a combination of both (e.g., using buttons, touch screen interface, or other input).

Alternatively, in some implementations, the motor base 1204 is coupled to another device that provides a control interface, for example, a computing device. The computing device can include software for both controlling the motor base 1204 and providing a user interface. The user interface can allow the user to provide commands for dispensing liquids. For example, one or more interface controls can allow the user to specify a particular command using menus, command codes, or a combination of both (e.g., using buttons, touch screen interface, or other input).

According to the embodiment of FIG. 14, two or more containers 1206A and 1206B can be coupled to the motor base 1204 and can be driven to dispense the liquid as described above. By having the two or more containers 1206A and 1206B various additional functionality can be achieved by the system 1200. For example, the two or more containers 1206A and 1206B can carry a liquid having substantially a same formulation. In such instances, if the liquid of one container (e.g., container 1206A) is exhausted the motor base 1204 can be switched to drive dispensing from the second container (e.g., container 1206B). This allows for seamless transition such that the liquid can be substantially supplied continuously without substantial interruption to replace a container. The container (e.g., container 1206A) with the exhausted liquid can be replaced by personnel while the liquid from the second container (e.g., container 1206B) is being dispensed. Although the examples below are to a series process and system, it should be recognized that the motor base 1204 could be driven in parallel on some occasions to facilitate simultaneous dispensing from both (or more) containers 1206A and 1206B as desired.

In some implementations, liquid colorants are the liquid dispensed by the dispensing system 1202 (and further described methods below) into an injection molding device in order to produce colored plastic articles. However, other types of molding devices may be used too including blow molding, injection blow molding, extrusion molding, compression molding, and rotational molding devices for example. In particular, a neutral plastic base material (e.g., pellets or beads of plastic resin) can be heated by the molding device. Advantageously, the plastic base material may possess its "natural" color (i.e., the inherent color of the plastic resin without the addition of dyes, pigments or other colorants). The plastic base material may be white, beige, grey, or other neutral color and it may be transparent, translucent or opaque. A precise amount of a liquid colorant can be dosed into the neutral plastic base material so that the melted plastic base material is colored accordingly. The amount of colorant will vary depending on the nature of the plastic base material, the colorant, the desired color, etc. but an amount of about 0.001%-3% by weight or volume is generally useful. The colored melted plastic is then delivered by injection or extrusion into a mold cavity or an extruder head having the shape or profile of the plastic article that is to be formed which could be, for example, a bottle, a film, or many other products conventionally produced by plastic molding devices.

While the dispensing system 1202 and methods 1300 and 1400 are particularly described in the context of a dispenser for delivering liquid colorant to a molding device, this is merely to illustrate one preferred application. The invention disclosed herein may be used to dispense a variety of liquids as previously described and the dispensed liquid may be delivered to devices other than molding devices (e.g., a mixing or blending device or a device that fills a container) or may be delivered for immediate end use (e.g., a sprayed liquid or an extruded paste). Examples of other additives that could be dispensed included antioxidants, processing stabilizers, heat stabilizers, lubricants, light stabilizers, flame retardants, optical brighteners, biocides, antimicrobials, oxygen scavengers, fragrances, conductive additives, repellants, foaming agents, anti-static agents, nucleating agents, clarifying agents, plasticizers, surface modifiers, slip agents, chain extenders, crosslinking agents, coupling agents, and compatibilizers. The amount of additive will vary depending on the nature of the plastic base material, the additive, the desired properties, etc. but an amount of about 0.0001%-10% by weight or volume is generally useful.

Figure 15:
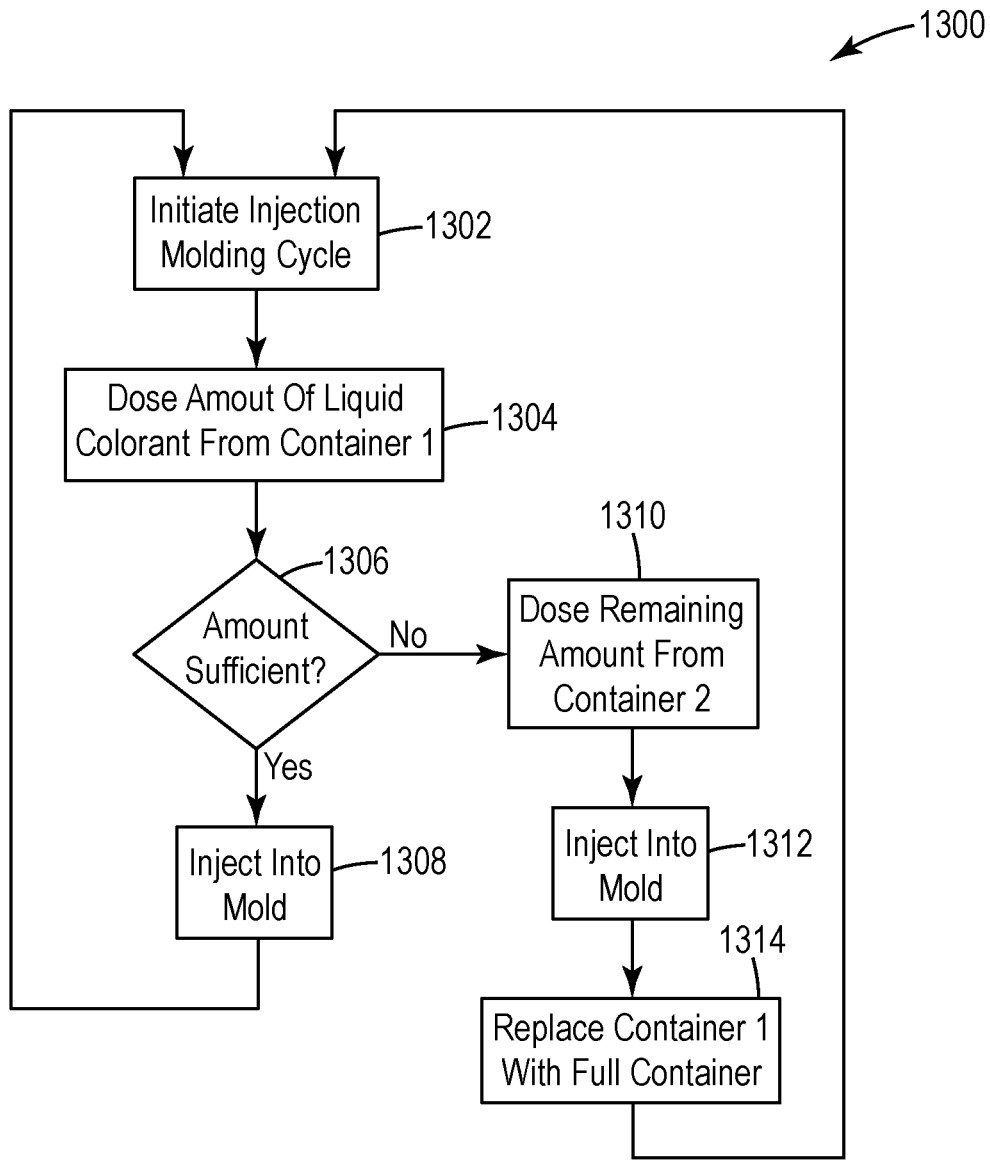
FIG. 15 shows a method of using the dispensing system of FIG. 14 during an injection molding process according to an example of the present application.

FIG. 15 shows one method 1300 of using the dispensing system 1202 during the injection molding process. The method 1300 includes initiation of an injection molding cycle 1302. Initiating an injection molding cycle can include releasing base plastic material from a hopper into a heating portion of the injection molding device to melt the base plastic material. During such molding cycle the method 1300 attempts to dispense an amount of the liquid colorant from the first container (e.g., container 1206A). The method 1300 than determines 1306 if the amount dispensed from the first container corresponds to a desired amount of liquid colorant was sufficient. If the amount liquid dispensed is determined to be sufficient, the liquid colorant along with plastic(s) or other materials is injected into the mold 1308. However, if the amount dispensed from the first container does not correspond to the desired amount (i.e. is determined to be insufficient) a remaining amount of liquid colorant to achieve the desired amount is dispensed 1310 from a second container (e.g., container 1206B) and is injected along with plastic(s) or other materials into the mold 1312. At any time in the method 1300 sequent to the step 1306 where it is determined if the amount of liquid dispensed is determined to be insufficient, the first container (e.g., container 1206A) can be replaced or refilled to provide for a full container. Replacement with a full container can occur without interruption of the molding process as the method proceeds with steps 1310 and 1312 in parallel with the replacement of the first container.

Figure 16:
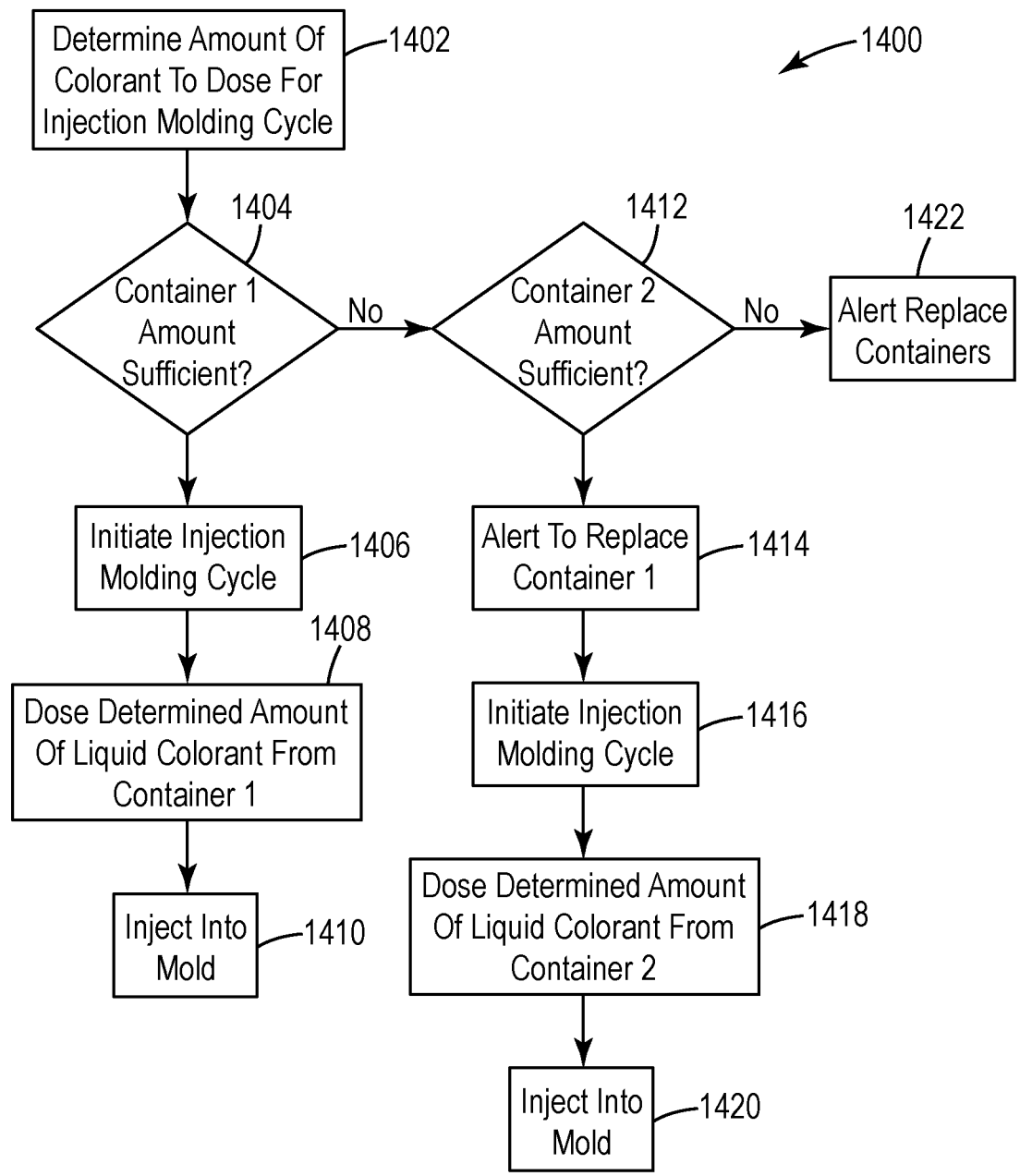
FIG. 16 shows another method of using the dispensing system of FIG. 14 during the injection molding process according to an example of the present application.

FIG. 16 shows another method 1400 of using the dispensing system 1202 during the injection molding process. The method 1400 includes a determination 1402 of an amount of liquid colorant desired to dose for each injection molding cycle. For example, personnel can input parameters to the injection molding device or to a control interface for a motor that drives the pump of the integrated pump cap. In some implementations, commands are associated with a timing cycle for the injection molding machine such that the precise amount of colorant can be dosed for each molding cycle. The method 1400 can determine 1404 if the first container (e.g., container 1206A) has sufficient liquid colorant remaining to provide for the desired dose. For example, the weight of the first container can be sensed or other parameters of the first container indicative of fill level can be monitored or sensed. If the amount of liquid colorant remaining in the first container is determined to be sufficient, the method 1400 proceeds to initiate the injection molding cycle 1406. Initiating an injection molding cycle can include releasing base plastic material from a hopper into a heating portion of the injection molding device to melt the base plastic material. The determined 1408 dose of liquid colorant is added to the melting or melted base plastic material from the first container. The melted colored plastic, is then injected 1410 into a mold cavity to form a final color molded plastic.

However, if the method 1400 determines the first container (e.g., container 1206A) has insufficient liquid colorant remaining to provide for the desired dose, the method proceeds to determine 1412 if the second container (e.g., container 1206B) has sufficient liquid colorant remaining to provide for the desired dose. For example, the weight of the second container can be sensed or other parameters of the second container indicative of fill level can be monitored or sensed. If the amount of liquid colorant remaining in the second container is determined to be sufficient, the method 1400 proceeds to initiate the injection molding cycle 1416. Initiating an injection molding cycle can include releasing base plastic material from a hopper into a heating portion of the injection molding device to melt the base plastic material. The determined 1418 dose of liquid colorant is added to the melting or melted base plastic material from the second container. The melted colored plastic is then injected 1420 into a mold cavity to form a final color molded plastic. At any time in the method 1400 sequent to the step 1404 where it is determined if the amount of liquid in the first container is insufficient to provide for the desired dose, the method 1400 can provide an alert 1414 to personnel that the first container needs to be replaced or refilled. Similarly, the method 1400 can provide for an alert 1422 to personnel should it be determined that both the first container and the second container contain insufficient liquid colorant to provide for the desired dose.

Figure 17:
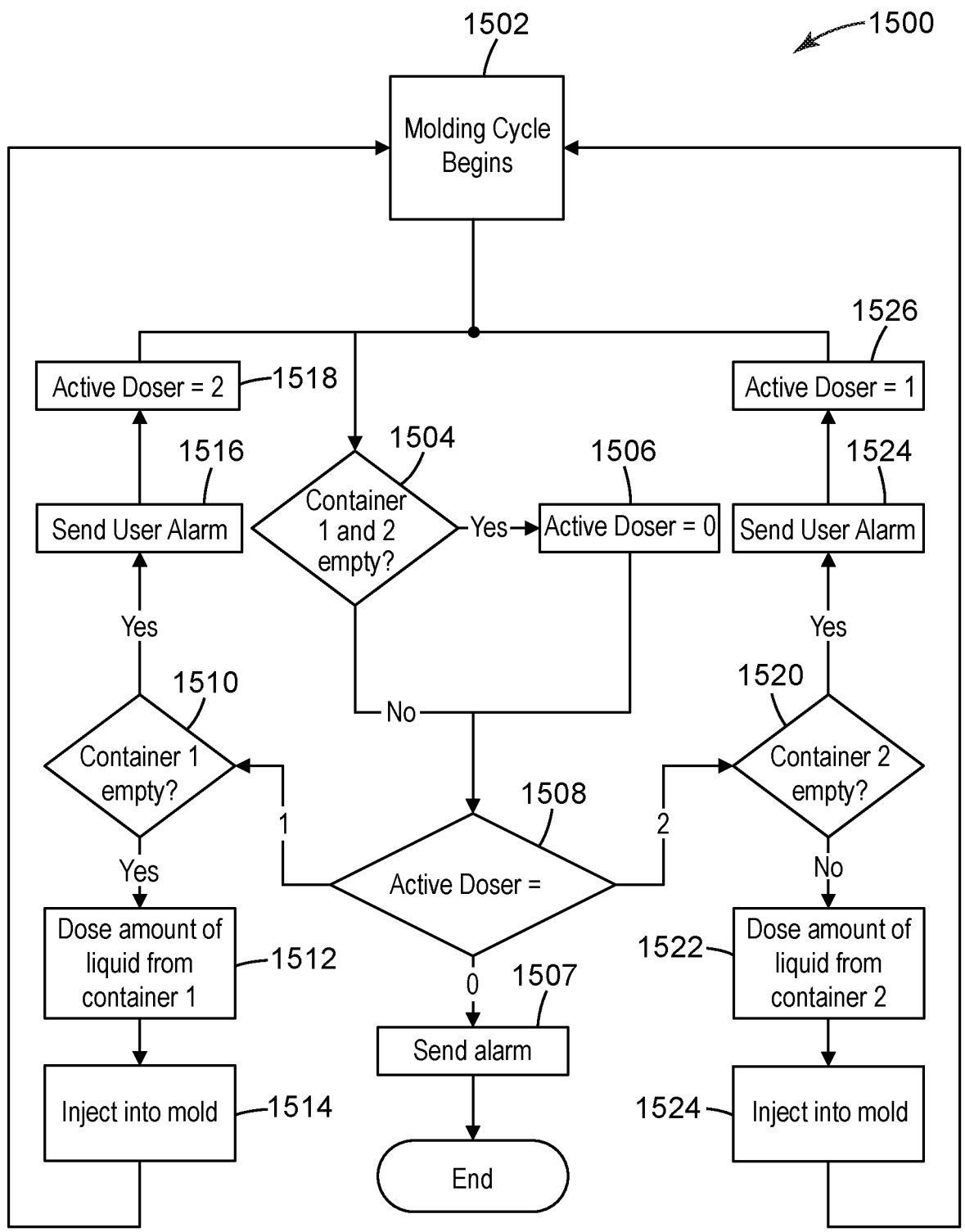
FIG. 17 shows yet another method of using the dispenser system of FIG. 14 during the injection molding process according to an example of the present application.

FIG. 17 shows yet another method 1500 of using the dispensing system 1202 during the injection molding process. The method 1500 can proceed as the molding cycle begins 1502. The method 1500 includes an initial determination 1504 if the first container and the second container are empty. If both are empty the dispensing system 1202 is not activated 1506. However, if one or both of the first container and the second container are not empty, the method 1500 activates 1508 the dispenser system 1202 and makes a determination if the first container is empty 1510 and if the second container 1520 is empty. If it is determined both are empty an alarm 1507 or alert can be activated.

If it is initially determined at step 1508 the first container is not empty, the method 1500 can proceed to dispense 1512 a desired amount of liquid from the first container and inject 1514 this amount into the mold. However, if the first container is later determined 1510 to be empty, the method 1500 can send an alarm 1516 or another signal to the user and also can activate 1518 the dispenser system 1202 to dispense from liquid container two.

If it is initially determined at step 1508 the second container is not empty, the method can proceed to dispense 1522 a desired amount of liquid from the second container and inject 1524 this amount into the mold. However, if the second container is later determined 1520 to be empty, the method 1500 can send an alarm 1524 or another signal to the user and also can activate 1526 the dispenser system 1202 to dispense from liquid container one.

As discussed previously, liquids other than colorants may be dispensed and molding systems other than injection molding systems may be used. The operational principles of these alternatives can be understood from the block diagrams and other FIGURES and description provided.

The operations described in this specification, in particular, processing commands for a motor to drive a pump to dispense a specified amount of liquid, can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question; e.g., code that constitutes processor firmware, a protocol stack, a database management system, an operating system, a cross-platform runtime environment, a virtual machine, or a combination of one or more of these. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one site or distributed across multiple sites and interconnected by a communication network.

Alternatively or in addition, the program instructions can be encoded on or can be included in a computer storage medium, a computer-readable storage device, a computer-readable storage substrate, a random or serial access memory array or device, or a combination of one or more of these. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Although the present disclosure has been described with reference to preferred embodiments, workers skilled in the art will recognize that changes can be made in form and detail without departing from the spirit and scope of the present disclosure.

WORKING EXAMPLES

Summary of Materials

The material used the example, referred to as Fluid 1, was a liquid colorant dispersion DX0 RED 1077-20, available from PolyOne (Avon Lake, Ohio).

Test Methods

Viscosity Measurement

Viscosity measurements were made using a Discovery HR-2 Instrument equipped with a 25 mm diameter parallel plate, ETC steel from TA Instruments (New Castle, Del.). Viscosities were measured at 20° C. using a flow ramp procedure at 5 points per decade at shear rates from 0.01 to 10 sec$^{-1}$ with a 1.00 mm gap offset, trimmed at 1.05 mm gap. After loading the material in the instrument, the sample was conditioned by soaking for 120 sec followed by applying a preshear at 1 sec$^{-1}$ for 30 sec. After conditioning the sample, a soak time of 120 sec was applied to the material before viscosity measurements.

Example 1

Figure 18:
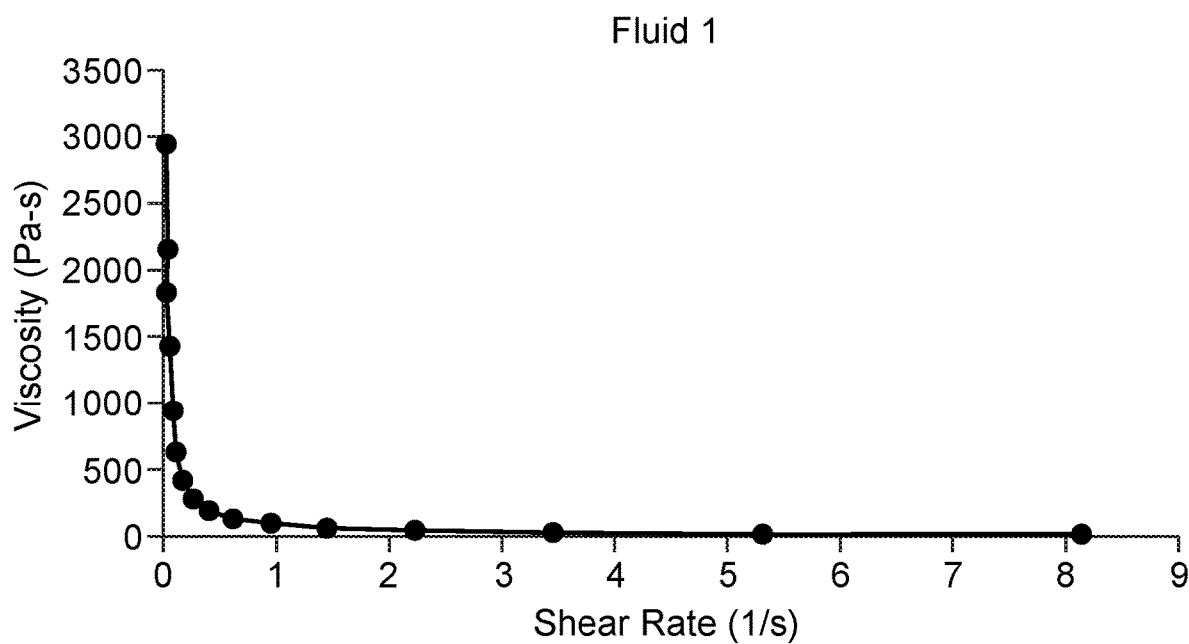
FIG. 18 show a graph of viscosity results for a non-Newtonian fluid according to Example 1.

The viscosity of Fluid 1 was measured as described above. The results are shown in FIG. 18. In Example 1, a container in accordance with this invention comprising a collapsible liner (available from 3M™ PPS™ Large Lid and Liner Kit, Part Number 16024) inside a rigid outer cup (available from 3M™ PPS™ Large Cup and Collar. Part Number 16023) was filled with Fluid 1, leaving approximately 25 mm of space at the top of the collapsible liner. A lid comprising a pump as described in United States Patent Application Publication No. 2013/0270303A1 (in this case. G-Rotor pump) was put onto the liner to cover its top, then the collar from the above-described 3M™ PPS™ Large Cup and Collar kit was fastened to the outer cup, thereby holding the pump lid securely to the liner and outer cup. Care was taken to ensure that the liquid did not touch the pump lid during assembly. A vacuum tube was assembled which comprised a plastic spout attached to one end of the hose and the other end of the hose was attached to a vacuum pump. The vacuum pump was turned on such that air would flow through the plastic spout into the vacuum pump. The plastic spout was placed into the outlet port of the pump lid of the container until the liquid in the container first touched the plastic spout on the vacuum tube. The liner partially collapsed when the air was removed. After one week, the liner remained partially collapsed, indicating that air had not re-entered the container through the pump.

Example 2

The procedure of Example 1 was repeated to create a sealed container of Fluid 1 without air in it. A plastic spout was attached to the pump lid outlet. The container was shaken slightly by hand, inverted and placed onto a dispenser as described in United States Patent Application Publication No. 2013/0270303A1. Fluid 1 was dispensed from the sealed container into a separate container at an initial rate of approximately 5 grams/sec. The dispensing continued until the rate of liquid dispensing from the pump decreased to 0.0 grams/sec for 2 seconds. The weight of fluid remaining in the collapsed container was recorded. Results are shown in Table 1.

Comparative Example 1

This is a comparative example of dispensing Fluid 1 from a container without first removing the air from the container. The procedure of Example 2 was repeated, with the exception that air was not removed from the container before placing the container on the dispenser. Results are shown in Table 1.

| Sample | Weight of Fluid in Container Before Dispensing (g) | Weight of Fluid Remaining in Container after Dispensing (g) |
| --- | --- | --- |
| Example 2 | 813 | 37 |
| Comparative Example 1 | 804 | 425 |

EXEMPLARY CLAIMS

In the First Embodiment, a method of filling a container with substantially only a liquid, the method can include: providing a volume defined by at least an inner liner and a lid of the container, wherein the liquid is contained within a first portion of the volume and a remaining portion of the volume contains a gas; and removing substantially all the gas from the volume via one or more ports that communicate with the volume while retaining substantially only the liquid within the volume.

In the Second Embodiment, the method of the first embodiment, wherein the step of providing the liquid and the gas includes pumping the liquid into volume through the one or more ports prior to, simultaneous with, or after the step of removing substantially all the gas from the volume.

In the Third Embodiment, the method of any one or any combination of previous embodiments, wherein the step of removing substantially all the gas from the volume includes at least one of applying a first pressure on a surface of the inner liner external to the volume to partially collapse the inner liner and applying a second pressure to the one or more ports to draw the gas through the one or more ports.

In the Fourth Embodiment, the method of the third embodiment, wherein the second pressure comprises a pressure less than a pressure in the volume.

In the Fifth Embodiment, the method of the third embodiment, wherein the step of applying the first pressure comprises one or more of filling second volume external to the inner liner to a pressure higher than a pressure in the volume and contacting the surface of the inner liner with a member to cause at least a partial collapse of the inner liner.

In the Sixth Embodiment, the method of any one or any combination of previous embodiments, wherein the step of removing substantially all the gas from the volume via the one or more ports includes coupling the lid to a remainder of the container to displace the gas through the one or more ports.

In the Seventh Embodiment, the method of any one or any combination of previous embodiments, wherein the method simultaneously includes the step of providing the liquid and the gas to the volume and removing substantially all the gas from the volume via the one or more ports.

In the Eighth Embodiment, the method of any one or any combination of previous embodiments, wherein at least one of the one or more ports are in the lid and the lid includes a pump cap that further comprises: a pump coupled to the pump cap and disposed within the volume; a dispenser communicating with the pump via at least one of the one or more ports and configured to dispense one or both the liquid and the gas from the container; and a motor coupled to rotationally drive the pump to dispense the liquid through at least one of the one or more ports and to the dispenser.

In the Ninth Embodiment, the method of the eighth embodiment, further comprising priming the pump with the liquid during removing substantially all the gas from the volume via the one or more ports.

In the Tenth Embodiment, the method of the eighth embodiment, further comprising providing a device comprising one or more of a plug, a membrane, or a valve coupled to the dispenser and configured to prevent gas from entering the volume via at least one of the one or more ports.

In the Eleventh Embodiment, the method of any one or any combination of previous embodiments, wherein at least one of the one or more ports are positioned at substantially a last to fill location of the volume and the step of removing substantially all the gas from the volume includes simultaneously venting the gas from the at least one of the one or more ports and filling the volume with the liquid until the liquid reaches the at least one of the one or more ports.

In the Twelfth Embodiment, the method of any one or any combination of previous embodiments, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a viscosity at a shear rate of 0.1 l/s that is 1.5 times greater than the viscosity of the fluid at a shear rate of 1.0 l/s.

In the Thirteenth Embodiment, the method of any one or any combination of previous embodiments, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a viscosity of between 0.1 and 10,000 Pa-s at a shear rate of 1.0 l/s.

In the Fourteenth Embodiment, the method of any one or any combination of previous embodiments, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a first viscosity that is relatively lower at a higher shear rate such as during flow into the pump, and then a second viscosity that is relatively higher at a lower shear rate such as after the liquid has stopped flowing into the pump.

In the Fifteenth Embodiment, the method of any one or any combination of previous embodiments, wherein the inner liner comprises a flexible material that is collapsible as at least one of the liquid and the gas are withdrawn from the volume and is expandable as at least one of the liquid and gas is provided to the volume.

In the Sixteenth Embodiment, a method of filling a container with substantially only a liquid, the method can include: providing a flexible liner and a lid that define a volume; collapsing the flexible liner substantially fully such that substantially no gas is present in the volume; and sequent to collapsing the flexible liner, filling the volume with substantially only the liquid via one or more ports that communicate with the volume.

In the Seventeenth Embodiment, the method of the sixteenth embodiment, wherein the step of removing substantially all the gas from the volume includes at least one of applying a first pressure on a surface of the inner liner external to the volume to partially collapse the inner liner and applying a second pressure to the one or more ports to draw the gas through the one or more ports.

In the Eighteenth Embodiment, the method of the seventeenth embodiment, wherein the second pressure comprises a pressure less than a pressure in the volume.

In the Nineteenth Embodiment, the method of the seventeenth embodiment, wherein the step of applying the first pressure comprises one or more of filling second volume external to the inner liner to a pressure higher than a pressure in the volume and contacting the surface of the inner liner with a member to cause at least a partial collapse of the inner liner.

In the Twentieth Embodiment, the method of any one or any combination of embodiments 16-19, wherein at least one of the one or more ports are in the lid and the lid includes a pump cap that further comprises: a pump coupled to the pump cap and disposed within the volume; a dispenser communicating with the pump via the at least one of the one or more ports and configured to dispense one or both the liquid and the gas from the container; and a motor coupled to rotationally drive the pump to dispense the liquid through the least one of the one or more ports and to the dispenser.

In the Twenty-first Embodiment, the method of the twentieth embodiment, further comprising priming the pump with the liquid during removing substantially all the gas from the volume via the one or more ports.

In the Twenty Second Embodiment, the method of the twentieth embodiment, further comprising providing a device comprising one or more of a plug, a membrane, or a valve coupled to the dispenser and configured to prevent gas from entering the volume via at least one of the one or more ports.

In the Twenty Third Embodiment, the method of any one or any combination of embodiments 16-22, wherein at least one of the one or more ports are positioned at substantially a last to fill location of the volume and the step of removing substantially all the gas from the volume includes simultaneously venting the gas from the at least one of the one or more ports and filling the volume with the liquid until the liquid reaches the at least one of the one or more ports.

In the Twenty Fourth Embodiment, the method of any one or any combination of embodiments 16-23, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a viscosity having a viscosity at a shear rate of 0.1 l/s that is 1.5 times greater than the viscosity of the fluid at a shear rate of 1.0 l/s.

In the Twenty Fifth Embodiment, the method of any one or any combination of embodiments 16-23, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a viscosity of between 0.1 and 10,000 Pa-s at a shear rate of 1.0 l/s.

In the Twenty Sixth Embodiment, the method of any one or any combination of embodiments 16-23, wherein the liquid comprises any one or any combination of adhesives, cements, colorants, coatings, detergents, epoxies, dyes, fillers (e.g., body filler), nano-materials, oils, paints (e.g., automotive paints), pastes, pigments, caulks, urethanes, polymer additives (which may be organic or inorganic), sealants, stains, toners, varnishes, waxes having a viscosity that is relatively lower at a higher shear rate such as during flow into the pump, and then a second viscosity that is relatively higher at a lower shear rate such as after the liquid has stopped flowing into the pump.

In the Twenty Seventh Embodiment, a system for dispensing a liquid can include: a first liquid container; a second liquid container; and a dispensing device configured to couple to both the first liquid container and the second liquid container, the dispensing device configured to actuate dispensing of a specific amount of liquid from either container as desired.

In the Twenty Eighth Embodiment, the system of the twenty-seventh embodiment, wherein the dispensing device includes a motor configured to drive a pump in each container to dispense the specified amount of the liquid.

In the Twenty Ninth Embodiment, the system of any one or any combination of embodiments 27-28, wherein the dispensing device is configured to switch dispensing from the first liquid container to dispensing from the second liquid container upon a sensed condition related to the amount of liquid remaining in the first liquid container.

In the Thirtieth Embodiment, the system of any one or any combination of embodiments 27-29, wherein the dispensing device is configured to allow the replacement of either the first liquid container or the second liquid container with a third container including during dispensing.

In the Thirty First Embodiment, the system of the thirtieth embodiment, wherein the dispensing device is configured such that the replacement of either the first liquid container or the second liquid container occurs simultaneous with the dispensing device dispensing the specific amount of liquid from the other of the first liquid container or the second liquid container.

In the Thirty Second Embodiment, the system of the thirtieth embodiment, wherein the dispensing device is configured to dispense from both the first liquid container and the second liquid container simultaneously or sequentially.

In the Thirty Third Embodiment, a method of dispensing a liquid during a molding process comprising: receiving a command to dispense a specified amount of the liquid; determining if one of a first liquid container or a second liquid container has a sufficient amount of the liquid remaining therein to supply the specified amount; dispensing the specified amount of the liquid from at least one of the first liquid container or the second liquid container if the at least one of the first liquid container and the second liquid container is determined to have the sufficient amount of liquid; and replacing the first liquid container or the second liquid container with a third liquid container during the molding process if the first liquid container or the second liquid container is determined to have an insufficient amount of the liquid remaining therein to provide the specified amount.

In the Thirty Fourth Embodiment, the method of example 33, wherein the replacing of the first container or the second container occurs simultaneous with or sequent to the dispensing the specified amount of the liquid.

In the Thirty Fifth Embodiment, the method of any one or any combination of examples 33-34, wherein dispensing the specified amount of the liquid from at least one of the first container or the second container includes dispensing from both the first container or the second container during the molding process.

In the Thirty Sixth Embodiment, a method of dispensing a liquid during a molding process comprising: dispensing a first amount of the liquid from a first liquid container during the molding process; determining if the first amount of the liquid corresponds to a specified amount of the liquid; without replacing the first container, dispensing a second amount of the liquid from a second container during the molding process if the first amount of the liquid is determined not to correspond to the specified amount of the liquid.

In the Thirty Seventh Embodiment, the method of the thirty-sixth embodiment, further comprising replacing the first liquid container or the second liquid container with a third liquid container during the molding process if the first liquid container or the second liquid container is determined to have an insufficient amount of the liquid remaining therein to provide the specified amount.

In the Thirty Eight Embodiment, the method of the thirty-seventh embodiment, wherein the replacing of the first container or the second container occurs simultaneous with or sequent to the dispensing the specified amount of the liquid.

In the Thirty Ninth Embodiment, a device for dispensing a liquid can include: a motor configured to couple to both a first liquid container and a second liquid container, the motor configured to actuate dispensing of a specific amount of liquid from either container as desired.

In the Fortieth Embodiment, the device of the thirty-ninth embodiment, wherein the device includes a motor configured to drive a pump in each container to dispense the specified amount of the liquid.

In the Forty First Embodiment, the device of any one or any combination of embodiments 39-40, wherein the device is configured to switch dispensing from the first liquid container to dispensing from the second liquid container upon a sensed condition related to the amount of liquid remaining in the first liquid container.

In the Forty Second Embodiment, the device of any one or any combination of embodiments 39-41, wherein the dispensing device is configured to allow the replacement of either the first liquid container or the second liquid container with a third container including during dispensing.

In the Forty Third Embodiment, the device of the forty-second embodiment, wherein the device is configured such that the replacement of either the first liquid container or the second liquid container occurs simultaneous with the dispensing device dispensing the specific amount of liquid from the other of the first liquid container or the second liquid container.

In the Forty fourth Embodiment, the device of the forty-second embodiment, wherein the device is configured to dispense from both the first liquid container and the second liquid container simultaneously or sequentially.

What is claimed is:

1. A system for dispensing a liquid comprising:
   a first liquid container;
   a second liquid container;
   a dispensing device configured to couple to both the first liquid container and the second liquid container, the dispensing device configured to actuate dispensing of a specific amount of liquid from either container as desired;
   wherein the first liquid container and the second liquid container each comprise a lid that comprises an integrated pump cap further comprising a pump;

wherein the dispensing device comprises a motor configured to drive the pump in each container to dispense the specified amount of the liquid.

2. The system of claim 1, wherein the dispensing device is configured to switch dispensing from the first liquid container to dispensing from the second liquid container upon a sensed condition related to the amount of liquid remaining in the first liquid container.

3. The system of claim 1, wherein the first liquid container and second liquid container each have gas removed from the first liquid container or second liquid prior container such that substantially only liquid remains within the container.

4. The system of claim 1, wherein the dispensing device is configured to allow the replacement of either the first liquid container or the second liquid container with a third container including during dispensing.

5. The system of claim 4, wherein the dispensing device is configured such that the replacement of either the first liquid container or the second liquid container occurs simultaneous with the dispensing device dispensing the specific amount of liquid from the other of the first liquid container or the second liquid container.

6. The system of claim 4, wherein the dispensing device is configured to dispense from both the first liquid container and the second liquid container simultaneously or sequentially.

7. The system of claim 1, wherein the first liquid container or second liquid container comprises an inner liner, wherein a volume of the first liquid container is defined by portions of the lid and the inner liner.

8. The system of claim 7, further comprising a member configured to be movable to contact and apply a mechanical pressure to an outer surface of the inner liner to displace substantially all the gas from the volume.

9. The system of claim 7, wherein the lid comprises a projection that extends downward into the volume when the lid is disposed on the container, wherein the projection facilitate the movement of substantially all the gas from the volume upon coupling of the lid to the container.

10. The system of claim 7, wherein the lid comprises a first port configured to receive and dispense the liquid and a second port configured to vent gas from the volume.

* * * * *